(12) United States Patent
Zhang et al.

(10) Patent No.: US 11,093,529 B2
(45) Date of Patent: Aug. 17, 2021

(54) METHOD FOR DISPLAYING LANDMARK DATA

(71) Applicant: VIA Technologies, Inc., New Taipei (TW)

(72) Inventors: Guo-Feng Zhang, Shanghai (CN); Yi-Fei Zhu, Shanghai (CN)

(73) Assignee: VIA Technologies, Inc., New Taipei (TW)

(*) Notice: Subject to any disclaimer, the term of this patent is extended or adjusted under 35 U.S.C. 154(b) by 276 days.

(21) Appl. No.: 15/937,879

(22) Filed: Mar. 28, 2018

(65) Prior Publication Data

US 2018/0225305 A1 Aug. 9, 2018

Related U.S. Application Data

(63) Continuation of application No. 14/269,214, filed on May 5, 2014, now abandoned.

(30) Foreign Application Priority Data

Jul. 2, 2013 (CN) .......................... 201310273265.4

(51) Int. Cl.
 *G06F 15/16* (2006.01)
 *G06F 16/29* (2019.01)
 *G06F 16/31* (2019.01)
(52) U.S. Cl.
 CPC ............ *G06F 16/29* (2019.01); *G06F 16/313* (2019.01); *G06F 16/322* (2019.01)

(58) Field of Classification Search
 None
 See application file for complete search history.

(56) References Cited

U.S. PATENT DOCUMENTS

| | | | |
|---|---|---|---|
| 7,792,846 B1* | 9/2010 | Raffill | G06F 16/35 707/754 |
| 8,041,730 B1* | 10/2011 | Upstill | G06F 16/9537 707/769 |
| 2010/0205194 A1* | 8/2010 | Bezancon | G06F 16/29 707/758 |
| 2012/0143816 A1* | 6/2012 | Zhang | G06F 16/9535 707/607 |
| 2012/0246156 A1* | 9/2012 | Gupta | G06F 16/3334 707/731 |
| 2013/0166561 A1* | 6/2013 | Georgescu | G06F 16/78 707/739 |

(Continued)

*Primary Examiner* — Alex Gofman
(74) *Attorney, Agent, or Firm* — JCIPRNET

(57) ABSTRACT

A method for displaying landmark data from a search of a place name keyword, the method includes: inputting the place name keyword to a server to search for a plurality of landmark data, wherein each of the landmark data comprises fields of a landmark name, an objective level category, an address, and an address quoting frequency; sorting the landmark data by an electronic device to a display order, based on a characterized parameter for each of the landmark, wherein the characterized parameter is calculated based on at least a publicity, wherein the publicity is a calculation of the objective level category and the address quoting frequency with respectively weighting to the objective level category and the address quoting frequency; and displaying the landmark data by the electronic device according to the display order.

8 Claims, 14 Drawing Sheets

(56) References Cited

U.S. PATENT DOCUMENTS

2013/0218864 A1* 8/2013 Hong .................... G06Q 50/16
  707/709
2014/0344259 A1* 11/2014 Horling .................. G06N 5/02
  707/723

* cited by examiner

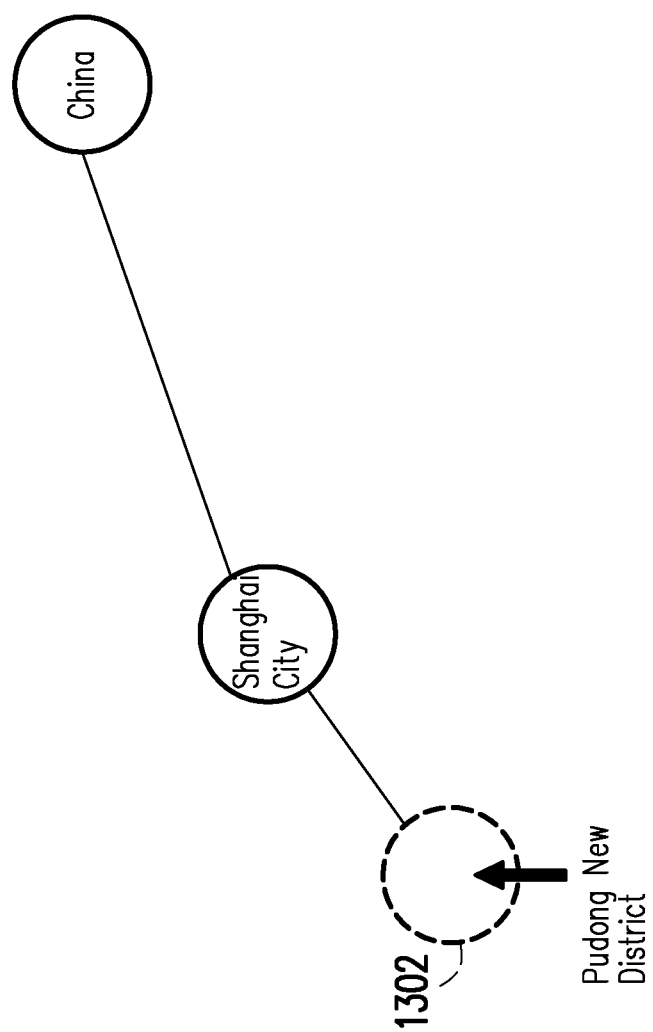

METHOD FOR DISPLAYING LANDMARK DATA

CROSS-REFERENCE TO RELATED APPLICATION

This application is a continuation application of and claims the priority benefit of a prior application Ser. No. 14/269,214, filed on May 5, 2014, now pending. The prior application Ser. No. 14/269,214 claims the priority benefit of China application serial no. 201310273265.4, filed on Jul. 2, 2013. The entirety of each of the above-mentioned patent application is hereby incorporated by reference herein and made a part of this specification.

BACKGROUND OF THE INVENTION

Field of the Invention

The invention relates to the technology of sorting documents and particularly relates to a region labeling method of data documents and a device thereof.

Description of Related Art

With recent advance in technology, the Internet has become an indispensable medium for obtaining information to people nowadays. Especially, with the development and popularization of network news, not only paper can be replaced to meet the current trend of environment protection, news messages can also be updated instantly in response to the rapidly changing events.

In order that the users can quickly find the network news they search for, sorting of network news becomes important, e.g. regional sorting of network news particularly. The reason is that most users desire to know news of their neighborhoods, specific locations, or particular cities.

However, web portals usually use a rough way to sort regional network news. For countries (e.g. China) that have a vast territory and an enormous population, network news of big cities is usually shown over local network news, for example. In addition, network news publishers usually carry out regional sorting of network news manually, which is rather time and effort consuming. Since news contents contain complex data messages, it is not easy for a machine to perform regional sorting on news automatically.

SUMMARY OF THE INVENTION

The invention is directed to a region labeling method of data documents and a device thereof, which compare the data documents with specific hierarchical region data so as to label corresponding regional characteristics of the data documents, thereby reducing the editor's load in regional sorting of the data documents and facilitating search of the data documents for the reader.

The invention provides a method for displaying landmark data from a search of a place name keyword. The method includes: inputting the place name keyword to a server to search for a plurality of landmark data, wherein each of the landmark data comprises fields of a landmark name, an objective level category, an address, and an address quoting frequency; sorting the landmark data by an electronic device to a display order, based on a characterized parameter for each of the landmark, wherein the characterized parameter is calculated based on at least a publicity, wherein the publicity is a calculation of the objective level category and the address quoting frequency with respectively weighting to the objective level category and the address quoting frequency; and displaying the landmark data by the electronic device according to the display order.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 13A to FIG. 13D are schematic diagrams illustrating a construction process of a tree structure according to an embodiment of the invention.

DESCRIPTION OF THE EMBODIMENTS

Figure 1:
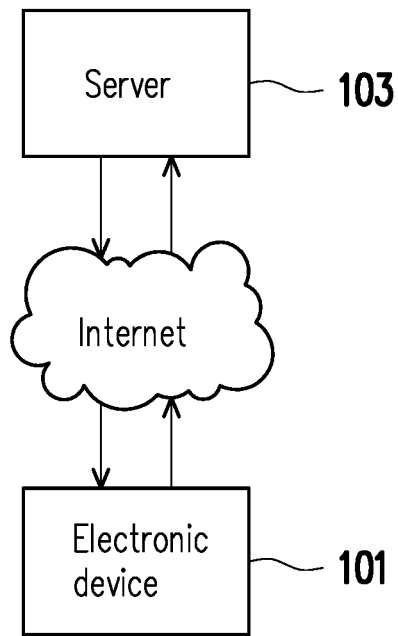
FIG. 1 is a block diagram illustrating an electronic device and a server according to a plurality of embodiments of the invention.

FIG. 1 is a block diagram illustrating an electronic device 101 and a server 103 according to an embodiment of the invention. The server 103 may be a personal computer, a workstation, a host computer, or computers or processors of various types. The electronic device 101 may be a laptop computer, a tablet computer, a personal digital assistant, a smart phone, or portable electronic devices of various types. The electronic device 101 communicates with the server 103 via a network. In this exemplary embodiment, a message notifying device 200 is utilized as the electronic device 101, for example. In other words, the electronic device 101 and the message notifying device 200 are substantially equivalent and interchangeable to each other.

When a user intends to set a desired information type to the message notifying device 200, the user can send a request message by the message notifying device 200. For instance, the request message may be "notify me immediately of the latest news regarding the nuclear catastrophe in Japan", "notify me immediately if there is a stock change exceeding 2% among my stocks," or "notify me immediately when the result of the 36th lottery is announced." In this embodiment of the invention, the user may input the request message to the message notifying device 200 by speech recognition. The message notifying device 200 can determine any possible intentions of the request message through natural language processing modules of various types, or a retrieving process can be further performed on a structured database stored a great amount of words thereby determining a property of a keyword being retrieved. After the request message is analyzed and comprehended, a corresponding command condition is obtained and, and the command condition can be transmitted to the server 130. For instance, the command condition may be "there is a latest news regarding the nuclear catastrophe in Japan", "a specific stock change has gone up over 2%" or "the result of the 36th lottery is announced." According to this command condition, the server 103 then inquires whether a corresponding prompt message is available, such as "contents of the latest news regarding the nuclear catastrophe in Japan," "the share price of the specific stock" or "winning numbers of the 36th lottery." In this embodiment of the invention, the request message can be analyzed and comprehended by the message notifying device 200. In another embodiment of the invention, the message notifying device 200 can transmit the request message to the server 103, so as to determine the possible intention of the request message by using the natural language processing modules of various types in the server 103. Or, the retrieving process can be further performed on the structured database stored with great amount of words therein to determine the property of the keyword being retrieved, thereby analyzing and comprehending the keyword being retrieved. After the server 103 has inquired whether the corresponding prompt message satisfying the command condition is available, if it is determined that the corresponding prompt message satisfying the command condition is available, the message notifying device 200 can then download and store the corresponding prompt message and play the corresponding prompt message. In this embodiment of the invention, since the latest information of the desired information type (which is set by the user) is recorded regularly (or immediately) by the server 103, the corresponding prompt message is inquired whenever the command condition is received. Therefore, in comparison with the latest information of the desired information type (which is set by the user) being recorded regularly (or immediately) by the message notifying device 200, the invention further reduces power consumption and work load of the message notifying device 200.

In this embodiment of the invention, the server 103 can inquire the corresponding prompt message satisfying the command condition within a specific time interval. The specific time interval can be a specific time interval set by the user, or a time interval when the user is away from the message notifying device 200. For instance, the user may leave the message notifying device 200 on a table due to factors such as bathing or forgot to bring it; after passing the specific time interval, the user may return to the table and pick up the message notifying device 200 once again. In this case, since there may be an update of the latest information of the desired information type set by the user when the user was away from the message notifying device 200, the message notifying device 200 can download and store the corresponding prompt message from the server 103, in correspondence to a start time and an end time of the specific time interval, which is then played to notify the user. Further details will be provided below.

Figure 2:
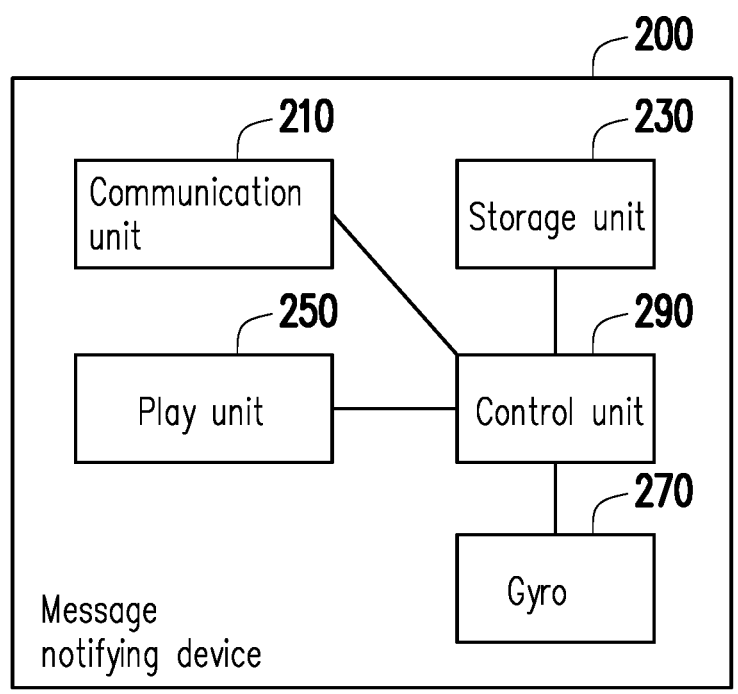
FIG. 2 is a block diagram illustrating a message notifying device according to an embodiment of the invention.
Figure 3:
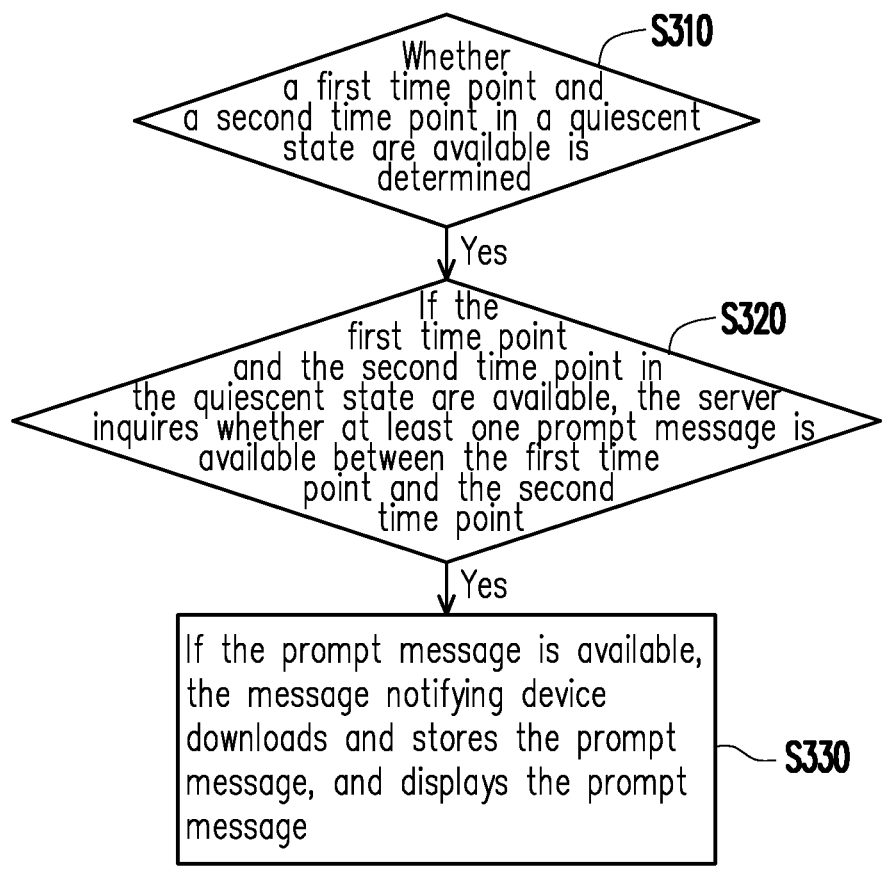
FIG. 3 is a flowchart illustrating a message notifying method according to an embodiment of the invention.

FIG. 2 is a block diagram illustrating a message notifying device according to an embodiment of the invention. As shown in FIG. 2, the message notifying device 200 includes a communication unit 210, a storage unit 230, a play unit 250, a gyro 270, and a control unit 290. The control unit 290 is coupled to the communication unit 210, the storage unit 230, the play unit 250, and the gyro 270. The communication unit 210 is configured to communicate with the server 103; the storage unit 230 is configured to store data; the play unit 250 is configured to play a message; and the gyro 270 is configured to detect an angular velocity of the message notifying device 200. The communication unit 210 can be a wireless communication chip or a wireless communication module, or can be a chip or a module having network connectivity. The storage unit 230 can be a data storage medium of various types. The play unit 250 can be a data playing device such as a speaker, a display, or other data output devices. The control unit 290 can be a functional module, a chip, or a microprocessor, of various types. FIG. 3 is a flowchart illustrating a message notifying method according to an embodiment of the invention. As shown in FIG. 3, the message notifying method according to the embodiment of the invention includes steps S310 to S330. Please refer to FIGS. 2 and 3 simultaneously.

In step S310, the control unit 290 determines whether a first time point (i.e., the start time as described above), at which the message notifying device 200 starts to enter a quiescent state, is available, and whether a second time point (i.e. the end time as described above), at which the message notifying device 200 ends the quiescent state, is available. For instance, the user may leave the message notifying device 200 on the table due to factors such as bathing or forgot to bring it. Accordingly, the message notifying device 200 enters the quiescent state at the first time point. In this case, the control unit 290 can record the first time point in the storage unit 230. After the specific time interval, the user may return to the table and pick up the message notifying device 200 once again. Accordingly, the message notifying device 200 ends the quiescent state at the second time point. In this case, the control unit 290 can also record the second time point in the storage unit 230. The control unit 290 can determine whether the first time point and the second time point are available by inquiring the storage unit 230.

In step S320, if the control unit 290 determines that the first time point and the second time point are available, the server 130 then inquires whether at least one prompt message is available between the first time point and the second time point. For instance, if the control unit 290 determines that the first time point and the second time point are available, it indicates that the user has been away from the message notifying device 200 for a period of time. In this case, the control unit 290 transmits the first time point and the second time point to the server 103 for inquiring, so as to determine whether a prompt message is available within the period of time. For example, if a missed call or an unread message occurs in the period of time, the prompt message can be "you have a missed call" or "you have an unread message." The prompt message can also be the desired information set by the user, such as top news, stock or lottery, etc.

In step S330, if at least one prompt message is available in the server 103, the message notifying device 200 downloads and stores the at least one prompt message in the storage unit 230, so that the play unit 250 can play the at least one prompt message. For instance, if a missed call or an unread message occurs, or if the desired information of top news, stock or lottery is available, between the first time point and the second time point when the user is away, the message notifying device 200 can download and store the prompt message of "you have a missed call" or "you have an unread message," or specific information regarding top news, the stock or lottery, in the storage unit 230 and to be played by the play unit 250. In this embodiment of the invention, a prompt message playing method of the play unit 250 includes playing texts or playing images, but the invention is not limited thereto.

Figure 4:
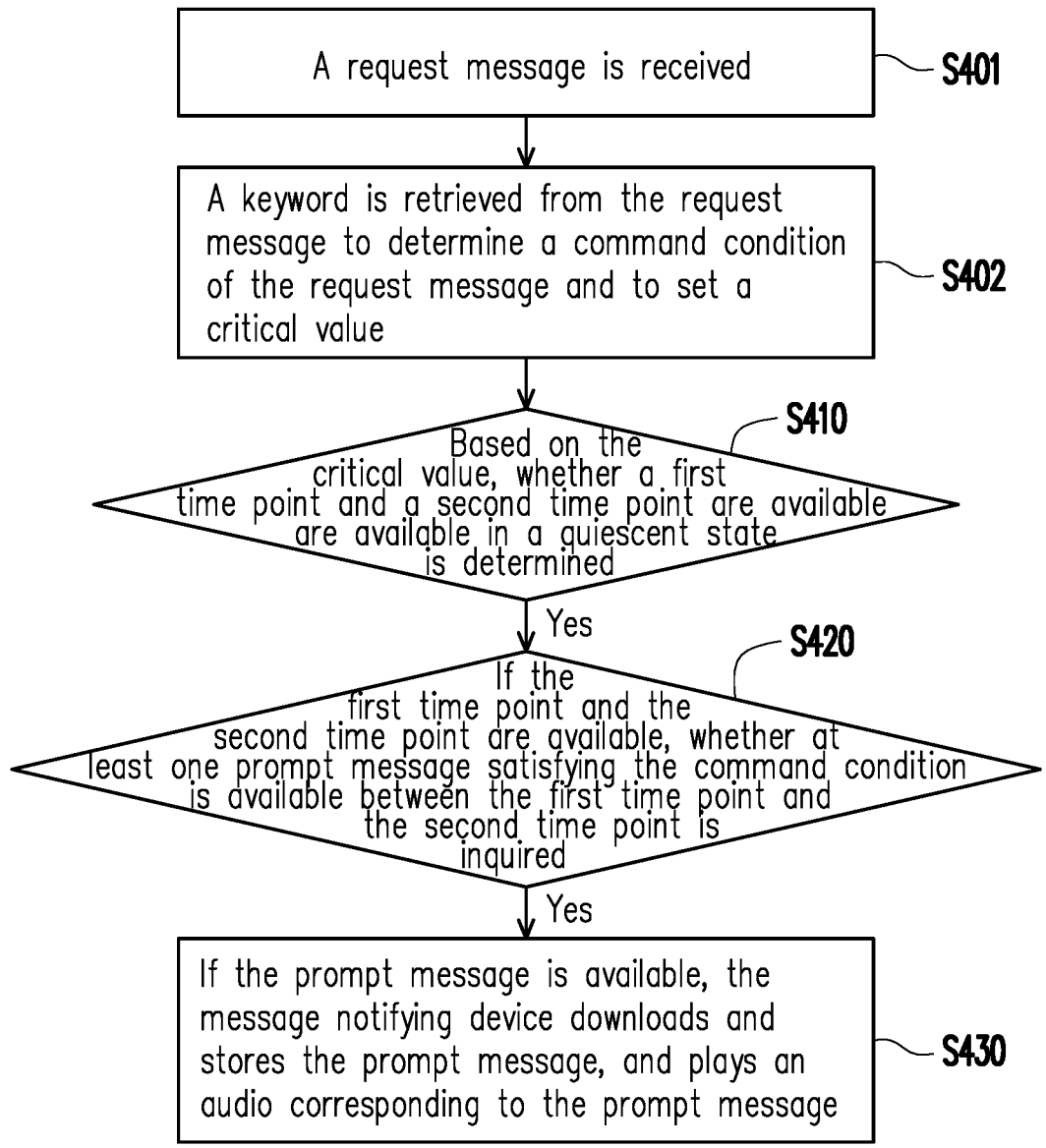
FIG. 4 is a flowchart illustrating a message notifying method according to another embodiment of the invention.

FIG. 4 is a flowchart illustrating a message notifying method according to another embodiment of the invention. As shown in FIG. 4, the message notifying method according to this embodiment of the invention includes steps S401, S402, S410, S420 and S430. Please refer to FIGS. 2 and 4 simultaneously.

In step S401, the user can receive a request message by the message notifying device 200. For instance, the request message from the user can be "notify me immediately when there is the latest news regarding the nuclear catastrophe in Japan," "notify me immediately when there is a stock change exceeding 2% among all my stocks," or "notify me immediately when the result of the 36th lottery is announced." As described above, in this embodiment of the invention, the user can input the request message to the message notifying device 200 by speech recognition. In another embodiment of the invention, the user can also input the request message by using a specific software interface or various other methods, but the invention is not limited thereto.

In step S402, at least one keyword is retrieved from the request message to determine a command condition of the request message and to set a critical value. In this embodiment of the invention, the keyword of the request message can be retrieved by the control unit 290 so as to be analyzed and comprehended by the control unit 290. In another embodiment of the invention, the request message can be transmitted to the server 103, and the keyword of the request message can be retrieved in the server 103 so as to be analyzed and comprehended. The keyword can be a type of the desired information set by the user, a wording for expressing a command, or other predefined wording to be analyzed and comprehended. In this embodiment of the invention, the control unit 290 can determine a possible intention of the request message by using the natural language processing module of various types, or the retrieving process can be performed on the structured database stored with great amount of words so as to determine the property of the keyword being retrieved. Accordingly, the retrieved keyword can be analyzed and comprehended so as to obtain the corresponding command condition from the request message, such as whether there is an update of the latest news regarding the nuclear catastrophe in Japan, whether a specific stock change has gone up over 2% or whether the result of the 36th lottery is announced. In addition, the critical value can be obtained by the control unit 290 with a result analyzed and comprehended from the keyword to be used in step S410.

In step S410, the control unit 290 determines, based on the critical value, whether a first time point, at which the message notifying device 200 starts to enter a quiescent state, is available, and whether a second time point, at which the message notifying device 200 ends the quiescent state, is available. The critical value can be a timing critical value or an angular velocity critical value. In this embodiment of the invention, the control unit 290 can detect an angular velocity of the message notifying device 200 by the gyro 270, so as to determine whether the message notifying device 200 enters the quiescent state or ends the quiescent state, thereby obtaining the first time point and the second time point. For instance, when the angular velocity of the message notifying device 200 is less than the angular velocity critical value, the control unit 290 can determine that the message notifying device 200 has entered the quiescent state. Whereas when the angular velocity of the message notifying device 200 is less than the angular velocity critical value while a duration thereof exceeds the timing critical value, the control unit 290 can determine that the user is away from the message notifying device 200, and set this time point as the first time point. Later on, when the angular velocity of the message notifying device 200 is greater than or equal to the angular velocity critical value, the control unit 20 can determine that the message notifying device 200 has ended the quiescent state (i.e. entering a moving state). In other words, the control unit 290 can determine that the user has picked up the message notifying device 200 once again, and set this time point as the second time point. As described above, the first time point and the second time point can be recorded in the storage unit 230. In this embodiment of the invention, if the message notifying device 200 includes a vibration mode (e.g. when an incoming call or a text message occurs, the message notifying device 200 enters the vibration mode), the angular velocity critical value can be greater than the angular velocity caused by the message notifying device 200 under the vibration mode. Accordingly, the control unit 290 will not determine that the message notifying device 200 under the vibration mode has entered the moving state. In another embodiment of the invention, the control unit 290 can determine whether the message notifying device 200 has entered or ended the quiescent state by determining whether the message notifying device 200 enters a sleep mode or whether a touch input signal is received by the message notifying device 200.

In step S420, if the control unit 290 determines that the first time point and the second time point are available, the server 130 can then inquire whether at least one prompt message satisfying the command condition is available between the first time point and the second time point. For instance, when "there is an update of the latest news regarding the nuclear catastrophe in Japan," "a specific stock change has gone up over 2%" or "the result of the 36th lottery is announced" occurs within the specific time interval between the first time point and the second time point, the prompt message is available in the server 103. In this embodiment of the invention, the prompt message can be contents corresponding to the latest information of the desired information type set by the user, such as "contents of the latest news regarding the nuclear catastrophe in Japan," "a share price of the specific stock" or "winning numbers of the 36th lottery." In another embodiment of the invention, the prompt message can also be a message that prompts the user about the contents of the latest information of the desired information type set by the user, such as "please be informed that the latest news regarding the nuclear catastrophe in Japan is available now," "dear user, your share price of the specific stock has gone up dramatically" or "the winning numbers of the 36th lottery are available now."

In step S430, if at least one prompt message is available in the server 103, the message notifying device 200 downloads and stores the at least one prompt message in the storage unit 230, and plays an audio corresponding to the at least one prompt message by the play unit 250. For instance, if the control unit 290 determines that the prompt message is available, such as "contents of the latest news regarding the nuclear catastrophe in Japan," "a share price of the specific stock" or "winning numbers of the 36th lottery," between the first time point and the second time point when the user is away through the server 103, the prompt message is downloaded and stored in the storage unit 230 to be played by the play unit 250. In this embodiment of the invention, the play unit 250 can play the contents of the prompt message in audio.

Based on the above, the invention is capable of receiving the request message input by the user by voice, and the keyword thereof is retrieved for determining the command condition and setting the critical value. When the user is away from the message notifying device, the critical value (timing critical value or angular velocity critical value) can be used to detect the first time point at which the message notifying device enters the quiescent state and the second time point at which the quiescent state is ended. Later, when the user picks up the message notifying device once again, the prompt message satisfying the command condition can be inquired in the server, and the prompt message can be downloaded and stored to the message notifying device. As a result, the prompt message can be played in audio so as to remind the user, such that the probability of ignoring an important message can be lowered.

An embodiment from another technical viewpoint to be implemented is provided as below to describe operations between the electronic device 101 and the server 103. As shown in FIG. 1, in another embodiment of the invention, the electronic device 101 and the server 103 are also used to execute a display method of landmark data.

In this embodiment of the invention, the user can input a place name keyword in order to search a specific landmark by the electronic device 101. Then, the electronic device 101 can transmit the input place name keyword to the server 103, so that the server 103 can search for the place name keyword. Next, the landmark data being searched is sorted, so that the landmark data which more likely satisfies the user's demands in the search can have a higher place in a sorting order. Lastly, the server transmits a sorting result of the landmark data back to the electronic device 101 for displaying, so that the user can find the most useful information therefrom. Subsequently, in this embodiment of the invention, the electronic device 101 can display a landmark name of each of the landmark data from the sorting result by using a map application. In another embodiment of the invention, the electronic device 101 itself has functions of searching a specific place name and sorting the searched landmark data. Therefore, the electronic device 101 can display the sorting result of the landmark data to the user without going through the server 103.

The landmark data can have specific characterized parameters. For instance, different landmark data may have different publicities. Accordingly, a corresponding order can be generated during a process of sorting the landmark data. Therefore, in this embodiment of the invention, before the user inputs the place name keyword by using the electronic device 101 to search the specific landmark, the server 103 can perform calculations for the publicities of the existing landmark data. Detailed descriptions thereof are provided as below.

Figure 5:
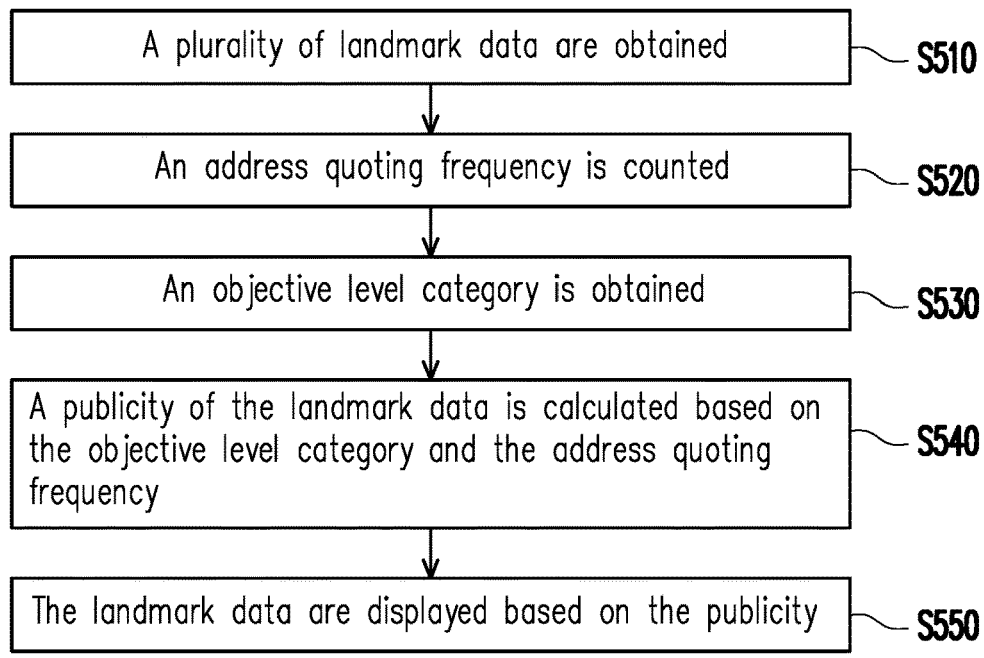
FIG. 5 is a flowchart illustrating a display method of landmark data according to an embodiment of the invention.

FIG. 5 is a flowchart illustrating a display method of landmark data according to an embodiment of the invention. Table 1 is a schematic diagram of the landmark data according to an embodiment of the invention. As shown in FIG. 5, the display method of the landmark data according to an embodiment of the invention includes steps S510 to S550. As shown in Table 1, the landmark data can include a landmark name, an objective level category, an address, an address quoting frequency, and a publicity being calculated correspondingly. The following description refers to FIG. 5 and Table 1 together.

TABLE 1

| Landmark data | Landmark name | Objective level category | Address | Address quoting frequency | Publicity |
|---|---|---|---|---|---|
| 1 | The Oriental Pearl | Class 4A | 1, Century Avenue, Pudong District, Shanghai City | 852318 | 113.94 |
| 2 | The Oriental Pearl | Shop | 9F of Arts and Crafts Building, 31, Beijing East Road, Xuanwu District, Nanjing City | 69 | 33.4 |
| 3 | Shanghai Wild Animal Park | Class 3A | 178, South Sixth Highway, Pudong Nanhui District, Shanghai City | 7501 | 77.54 |
| 4 | Hukou Waterfall | Class 4A | Linfen City, Shanxi Province . . . | 3236 | 80.49 |
| 5 | Hukou Waterfall Grand Hotel | Three Star | 18, Prospect Road, Hukou Waterfall Area, Ji County, Shanxi Province | 713 | 63.42 |
| 6 | South Beauty Restaurant | Two Star | 51-7, West Street, Tianmen Square, Xicheng District, Beijing City | 52024 | 81.16 |
| 7 | South Beauty Decoration | Shop | 135, North South Road, Industrial Park, Jiugong Town, Daxing District, Beijing City | 293 | 42.08 |
| 8 | South Beauty Industry | Shop | 37, Jinshan Road, Mudu Town, Wuzhong District, Suzhou City | 531 | 45.66 |
| 9 | South Bride Media | Shop | No. 9 of District 10, 188, South Fourth Ring West Road, Fengtai District, Beijing City | 1023 | 49.58 |

TABLE 1-continued

| Landmark data | Landmark name | Objective level category | Address | Address quoting frequency | Publicity |
|---|---|---|---|---|---|
| 10 | Beijing Hualian Hypermarket | Market | 5F, No. 515 of East Tower, Sichuan Building, 1 Fu Wai Avenue, Xicheng District, Beijing City | 5236 | 83.38 |
| 11 | McDonald's | Shop | 5F, No. 515 of East Tower, Sichuan Building, 1 Fu Wai Avenue, Xicheng District, Beijing City | 5236 | 59.38 |
| 12 | 217 | National Highway | X | X | 36 |
| 13 | 373 | Province Highway | X | X | 24 |
| 14 | 048 | Country Highway | X | X | 12 |

In step S510, a plurality of landmark data is obtained. For instance, the server 103 can obtain the plurality of landmark data by a database or a search engine, but the invention is not limited thereto. The plurality of landmark data obtained can be stored in a specific storage medium and serve as a landmark database.

In step S520, the address quoting frequency of the address of each of the plurality of landmark data on the Internet is counted. For instance, through the search engine, the server 103 can be informed that the address of "The Oriental Pearl" being "1, Century Avenue, Pudong District, Shanghai City" has been quoted for 852318 times on the Internet. Since the landmark name has a high arbitrariness, a great error may occur if a quoting frequency of the landmark name of the landmark data is used as a characterized parameter corresponding to the publicity instead of the address quoting frequency. For instance, when calculating the characterized parameter of the publicity of the address of a shop "The Oriental Pearl" being "9F of Arts and Crafts Building, 31, Beijing East Road, Xuanwu District, Shanghai City," said great error occurs due to the existence of the attraction "The Oriental Pearl" if the quoting frequency of the landmark name "The Oriental Pearl" is selected. On the contrary, the address corresponding to the landmark data is usually unique, and thus it is quite objective to use the address quoting frequency as the characterized parameter of the publicity in this step.

In step S530, the objective level category of each of the plurality of landmark data is searched. In this embodiment of the invention, the objective level category can be an accepted attraction rating (e.g. Class 1A to Class 5A) or an accepted store rating (e.g. One Star to Six Star). For instance, the attraction "Shanghai Wild Animal Park" being "Class 3A," the attraction "Hukou Waterfall" being "Class 4A," the shop "Hukou Waterfall Grand Hotel" being "Three Star," and the shop "South Beauty Restaurant" being "Two Star" can be searched by the server 103. In this embodiment of the invention, the objective level category can also have a hierarchical distinction property. For instance, "South Beauty Industry" and "South Bride Media" both have the property of "Shop," and "Beijing Hualian Hypermarket" has the property of "Market"; and road "217" has the property of "National Highway," "373" has the property of "Province Highway," and "048" has the property of "Country Highway." The objective level category as described above can have different other objective definitions, but the invention is not limited thereto.

In step S540, the publicity of each of the plurality of landmark data is calculated based on the objective level category of each of the plurality of landmark data and the address quoting frequency. In this embodiment of the invention, as the address quoting frequency gets higher, the publicity of the corresponding landmark data that is calculated by the server 103 also becomes higher. For instance, the address quoting frequencies of the shops "South Beauty Decoration" and "South Beauty Industry" are "293" and "531" respectively, and thus the publicity corresponding to "South Beauty Industry" is calculated to be greater than that of "South Beauty Decoration." In this embodiment of the invention, as a level of the objective level category gets higher, the publicity of the corresponding landmark data calculated by the server 103 is also higher. For instance, for "Beijing Hualian Hypermarket" and "McDonald's," both of their addresses are "5F, No. 515 of East Tower Sichuan Building, 1 Fu Wai Avenue, Xicheng District, Beijing City" and both of their address quoting frequencies are "5236". Since "Beijing Hualian Hypermarket" has the property of "Market" while "McDonald's" has the property of "Shop," the publicity of "Beijing Hualian Hypermarket" being calculated can be greater than that of "McDonald's". Similarly, in case of roads, the publicity of "217 National Highway" can be greater than that of "373 Province Highway" or "048 Country Highway."

In step S550, the plurality of landmark data is displayed on the electronic device 101 based on the publicity of each of the plurality of landmark data. For instance, after the landmark data and the corresponding publicity are calculated by the server 103, a result thereof can be transmitted back to the electronic device 101, so that the electronic device 101 can display the landmark data in the sorting order of the publicities.

In another embodiment of the invention, steps S510 to S550 can all be executed in the electronic device 101; or, with a communication and cooperation via the Internet, a part of steps S510 to S550 can be executed in the electronic device 101 while other parts of the steps can be executed in the server 103, and the invention is not particularly limited thereto.

Figure 6:
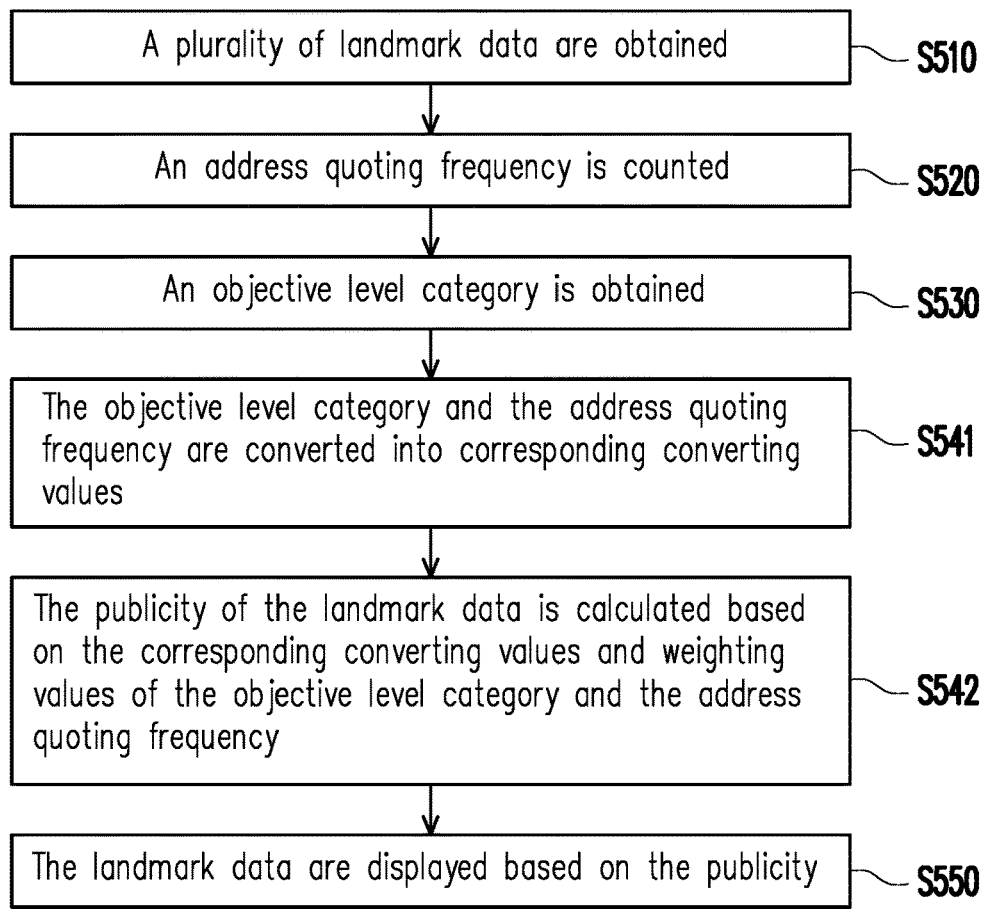
FIG. 6 is a flowchart illustrating a display method of landmark data according to another embodiment of the invention.

FIG. 6 is a flowchart illustrating a display method of landmark data according to another embodiment of the invention. As shown in FIG. 6, the display method of landmark data according to an embodiment of the invention includes steps S510 to S530, S541, S542 and S550. A difference between the present embodiment and the above embodiment is described in detail below. When calculating the publicity of the landmark data, steps S541 and S542 can be further executed as shown below.

In step S541, the objective level category of each of the plurality of landmark data and the address quoting frequency are converted into corresponding converting values. For instance, in the embodiments of the invention, in the case that the objective level category is the accepted attraction rating, the corresponding converting values of "Class 1A," "Class 2A," "Class 3A," "Class 4A" and "Class 5A" can be 20, 40, 60, 80 and 100 respectively; in the case that the objective level category is the accepted shop rating, the corresponding converting values of "One Star," "Two Star," "Three Star," "Four Star," "Five Star" and "Six Star" can be 20, 40, 60, 80, 100 and 120 respectively. In the case that the objective level category has the hierarchical distinction property, the corresponding converting values of "Shop" and "Market" can be 20 and 80 respectively; and the corresponding converting values of "National Highway," "Province Highway" and "Country Highway" can be 30, 60 and 90 respectively. In this embodiment of the invention, the corresponding converting values of the address quoting frequency can be calculated by using a natural logarithm of (ln x)×10. For instance, if the address quoting frequency of "Class 4A" attraction "The Oriental Pearl" is 852318 times, the corresponding converting value can be (ln 852318)×10-136.56; and if the address is not provided, the corresponding converting value can be 0. The corresponding converting values and method for calculating the corresponding converting values can be adjusted and changed according to various conditions, and the invention is not limited thereto.

In step S542, the publicity of the landmark data is calculated based on the corresponding converting values and weighting values of the objective level category and the address quoting frequency. In the embodiments of the invention, the weighting value corresponding to the objective level category can be 0.4, and the weighting value corresponding to the address quoting frequency can be 0.6, so that a formula for calculating the publicity of the landmark data can be: (the converting value of the objective level category)×0.4+(the converting value of the address quoting frequency)×0.6. For instance, the publicity of "Class 4A" attraction "The Oriental Pearl" can be (80)×0.4+((ln 852318)×10)×0.6=113.94, and the publicity of "South Beauty Industry" with the property of "Shop" is (20)×0.4+((ln 531)×10)×0.6=45.66.

As described above, when the landmark database in the electronic device 101 or the server 103 is constructed, the user can perform search for the specific landmark. Detailed descriptions thereof are provided as below.

Figure 7:
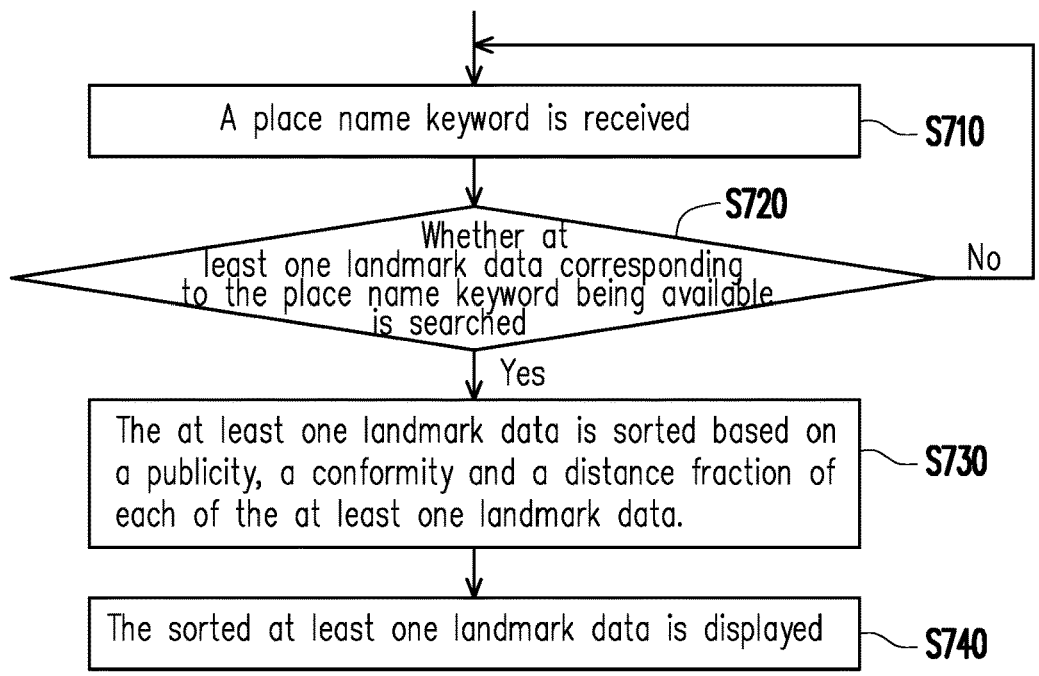
FIG. 7 is a flowchart illustrating a display method of landmark data according to yet another embodiment of the invention.

FIG. 7 is a flowchart illustrating a display method of landmark data according to yet another embodiment of the invention. As shown in FIG. 7, the display method of landmark data according to the embodiment of the invention includes steps S710 to S740.

In step S710, a place name keyword is received. For instance, when the user intends to search the specific landmark, the place name keyword can be input by the electronic device 101 vocally or manually.

In step S720, whether at least one landmark data corresponding to the place name keyword is available is searched. For instance, the electronic device 101 can search whether related landmark data is available by using the built-in landmark database, or transmitting the place name keyword to the server 103 for searching whether the related landmark data is available. If the related landmark data is found, step S730 is executed; otherwise, the electronic device 101 waits to receive another place name keyword.

In step S730, if at least one landmark data is found, the at least one landmark data is sorted based on a publicity, a conformity and a distance fraction of each of the at least one landmark data. For instance, when the related landmark data is found, the related landmark data may be in a very large amount. Accordingly, in consideration of general senses or cognitive habits for the user, the landmark data can be sorted by using the corresponding characterized parameters, so as to save time and efforts the user spends in the search. In this embodiment, besides the publicity (which is related to the objective level category and the address quoting frequency counted on the Internet), the characterized parameter corresponding to the related landmark data can further include a conformity (e.g. a conformity of text) and a distance fraction (e.g. a distance degree between the landmark and the user) of the related landmark data. However, in another embodiment of the invention, the characterized parameter corresponding to the landmark data can be one of the publicity, the conformity and the distance fraction, but the invention is not limited thereto.

In step S740, the sorted at least one landmark data is displayed on the electronic device 101. In this case, the user can use the electronic device 101 to inquire for the most useful landmark data among the plurality of sorted landmark data related to the input place name keyword.

Figure 8:
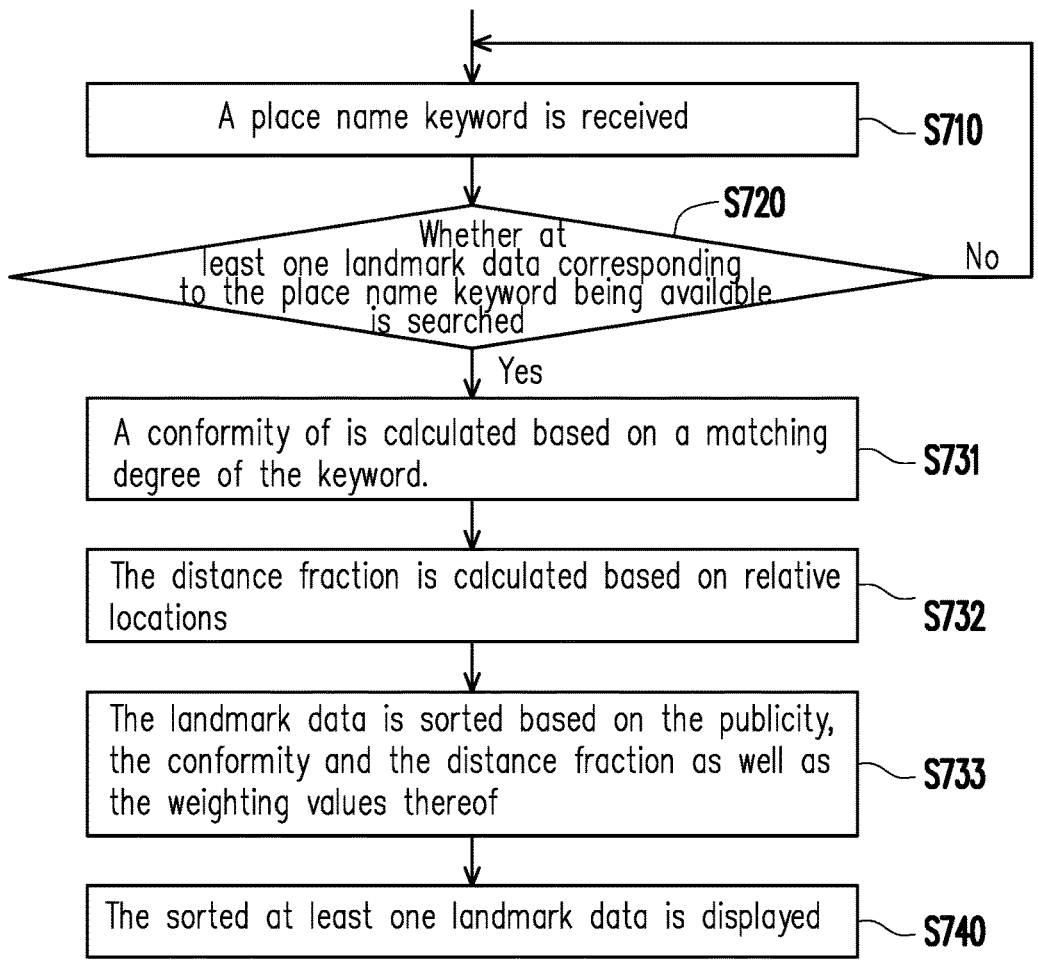
FIG. 8 is a flowchart illustrating a display method of landmark data according to yet another embodiment of the invention.

FIG. 8 is a flowchart illustrating a display method of landmark data according to yet another embodiment of the invention. As shown in FIG. 8, the display method of landmark data according to the embodiment of the invention includes steps S710, S720, S731 to S733, and S740. A difference between the present embodiment and the above embodiment is described in detail below. When sorting the searched landmark data corresponding to the place name keyword, steps S731 to S733 can be further executed as shown below.

In step S731, the conformity of each of the at least one landmark data is calculated based on a landmark name of each of the at least one landmark data and the place name keyword. In other words, the conformity is calculated based on a matching degree of searched landmark data to the place name keyword. For instance, in the case that the place name keyword input by the user is "South Beauty," the conformities of "South Beauty Restaurant," "South Beauty Decoration" and "South Beauty Industry" are all higher than the conformity of "South Bride Media."

In step S732, the distance fraction of each of the at least one landmark data is calculated based on a location of each of the at least one landmark data and a location of the electronic device 101. In other words, the distance fraction is calculated based on relative locations of the searched landmark data and the electronic device 101. For instance, in the case that the place name keyword input to the electronic device 101 by the user is "South Beauty," the distance fractions of "South Beauty Restaurant" and "South Beauty Decoration" are all higher than the distance fraction of "South Beauty Industry."

In step S733, the at least one landmark data is sorted based on the publicity, the conformity and the distance fraction as well as the corresponding weighting values thereof. For instance, the electronic device 101 can define the weighting values corresponding to the publicity, the conformity and the distance fraction based on different requirements, so as to decide an influence degree of each of the publicity, the conformity and the distance fraction on the sorting result.

Accordingly, when the user inquires for the specific landmark, the searching result displayed by the characterized landmark data is sorted according to the general senses or cognitive habits of the user, and therefore, the user can save the time for searching.

Based on the above, in the invention, the publicity is calculated by using the converting value and weighting value corresponding to the address quoting frequency and the objective level category of each of the plurality of landmark data. After the place name keyword is received, the conformity is calculated based on the matching degree of the searched related landmark data to the place name keyword. The distance fraction is calculated based on the relative locations of the related landmark data and the electronic device. The searched related landmark data is sorted based on the publicity, the conformity and the distance fraction, so as to be displayed on the electronic device.

As shown in FIG. 1, in another embodiment of the invention, the electronic device 101 and the server 103 are also used to execute a region labeling method of data documents. Furthermore, in the descriptions of this embodiment, a region labeling device 900 is utilized as the electronic device 101 for example. In other words, the electronic device 101 and the region labeling device 900 can be devices which are substantially equivalent and interchangeable to each other.

The user can use the region labeling device 900 to communicate with the server 103 via a network, so as to obtain a data document or reference information for labeling the data document. In this embodiment of the invention, the data document can be network news. For instance, first, when a large amount of network news is obtained by a network news editor, the network news is regionally classified and then labeled. In this embodiment of the invention, the network news editor can use the region labeling device 900 to obtain the reference information with regional names from the server 103, so as to construct a specific tree structure for analyzing and labeling a content property of the network news. In another embodiment of the invention, the network news editor can use the region labeling device 900 to directly obtain a constructed specific tree structure from the server 103. Each node in the tree structure represents each of the specific regional names, and the tree structure can be used to obtain administrative area names in all hierarchies on each of the specific regional names. The regional name can include an administrative area name and an iconic name, and a node of the iconic name can be located at a lowest hierarchy of the tree structure, wherein the iconic name can be a place name or an attraction name, or any regional personal names, social organization or other names, etc., but the invention is not limited thereto. Accordingly, for instance, a region of any attraction or social organization in the tree structure (i.e. each of father nodes) can then be obtained. Subsequently, the region labeling device 900 can analyze whether each of the network news includes a regional content (e.g. the place name keyword). If the regional content matches any one of the nodes in the tree structure, the region labeling device 900 can label such network news by the matched node. In other words, the network news editor can provide the network news having the regional content a corresponding regional characteristic by means of the region labeling device 900, so as to complete labeling or regional sorting of each of the network news (e.g. to which regional category does certain network news belong). Detailed description thereof is further provided as below.

Figure 9:
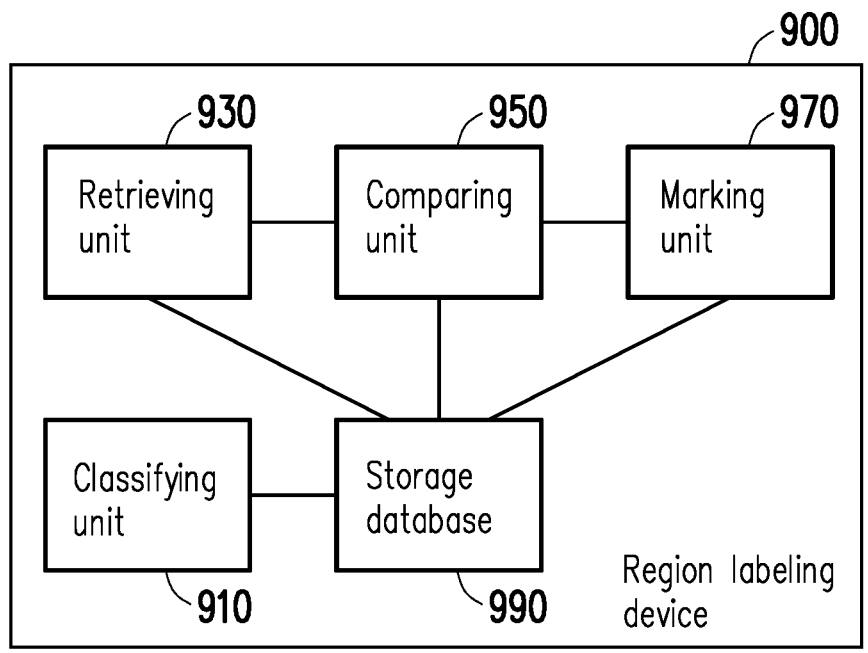
FIG. 9 is a block diagram illustrating a region labeling device of data documents according to an embodiment of the invention.
Figure 10:
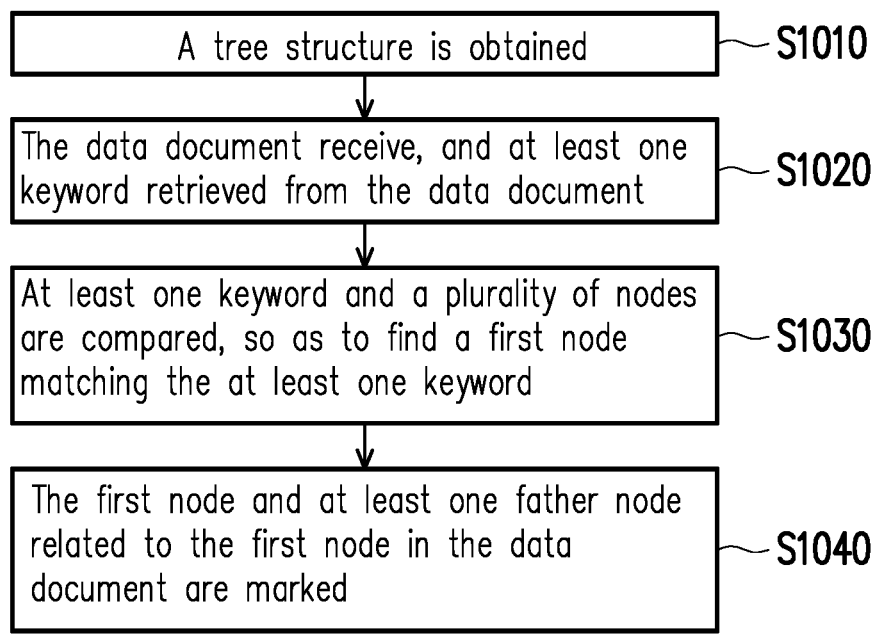
FIG. 10 is a flowchart illustrating a region labeling method of data documents according to an embodiment of the invention.
Figure 11:
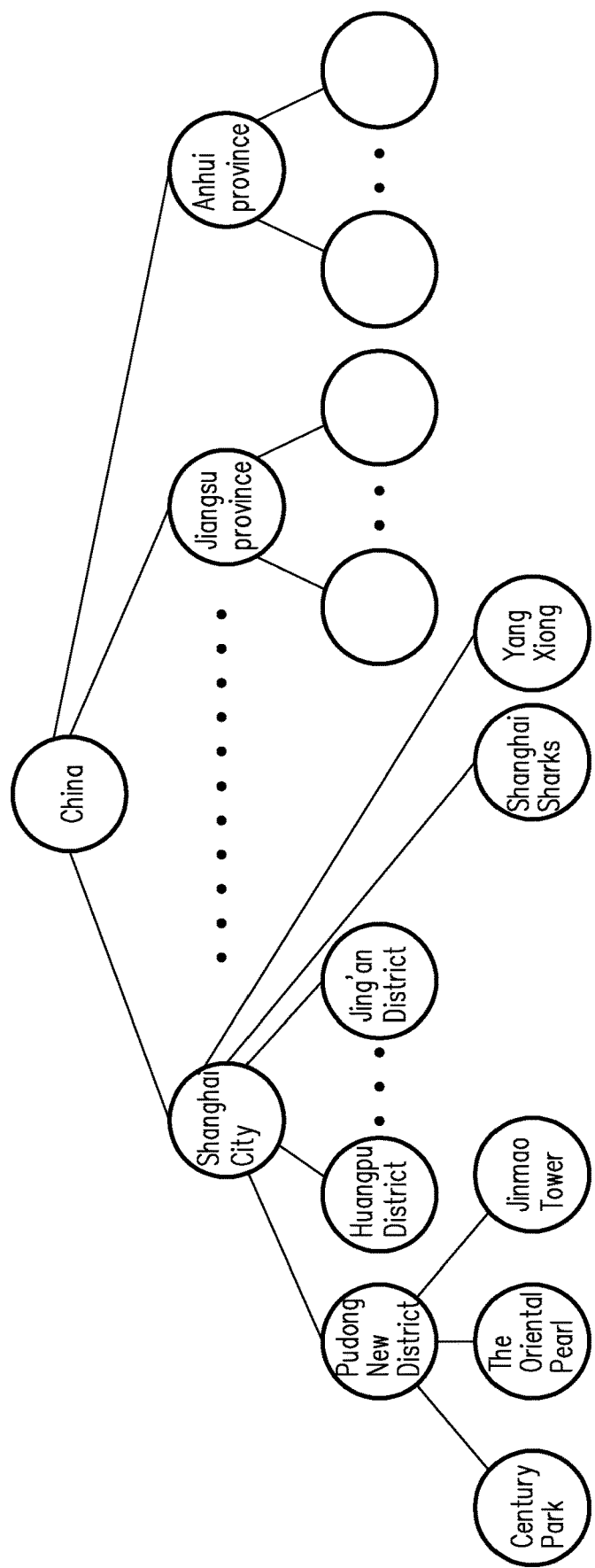
FIG. 11 is schematic diagram of a tree structure according to an embodiment of the invention.

FIG. 9 is a block diagram illustrating a region labeling device of data documents according to an embodiment of the invention. As shown in FIG. 9, the region labeling device 900 includes a classifying unit 910, a retrieving unit 930, a comparing unit 950, a labeling unit 970, and a storage database 990. The comparing unit 950 is coupled to the retrieving unit 930; the labeling unit 970 is coupled to the comparing unit 950; and the storage database 990 is coupled to the classifying unit 910, the retrieving unit 930, the comparing unit 950, and the labeling unit 970. The classifying unit 910, the retrieving unit 930, the comparing unit 950, and the labeling unit 970 can be functional modules or microprocessors of various forms, and the storage database 990 can be a storage medium in various forms. FIG. 10 is a flowchart illustrating a region labeling method of data documents according to an embodiment of the invention. As shown in FIG. 10, the region labeling method according to the embodiment of the invention includes steps S1010 to S1040. FIG. 11 is schematic diagram of a tree structure according to an embodiment of the invention. The following description refers to FIGS. 9, 10, and 11 together.

In step S1010, the classifying unit 910 can obtain the tree structure via the network. In this embodiment of the invention, the tree structure can include a plurality of nodes having a plurality of administrative area names and iconic names, and a hierarchical relationship exists between the administrative area names and the iconic names. In addition, the classifying unit 910 can store the obtained tree structure in the storage database 990. For instance, as shown in FIG. 11, each node of the tree structure can include the administrative area names in each hierarchy of China and the attraction names thereof. A relationship between upper nodes and lower nodes of the tree structure can correspond to the hierarchical relationship between the administrative area names and the iconic names. For instance, under the node "China," child nodes including each province or each municipality (e.g. Shanghai, Jiangsu province, and Anhui province, etc.) are included. Child nodes of districts (e.g. Pudong New District, Huangpu District, Jing'an District, etc.) are included under the node "Shanghai." Child nodes of the attractions (e.g. Century Park, The Oriental Pearl, Jinmao Tower, etc.) are included under the node "Pudong New District." In addition, as described above, the iconic names can be regional personal names and social organization names. As shown in FIG. 11, the node "Shanghai" can further include the child node of the professional basketball team "Shanghai Sharks" and the child node of the mayor of Shanghai "Yang Xiong."

In step S1020, the retrieving unit 930 can receive the data document from the network and retrieve at least one keyword from the data document. For instance, the retrieving unit 930 can receive a large amount of the network news from the server 103 via the network and store the received network news to the storage database 990. Contents of the received network news can include various regional keywords, such as "Jiangsu province" or "The Oriental Pearl." The retrieving unit 930 can analyze the contents and retrieve the keyword from the contents.

In step S1030, the comparing unit 950 can compare at least one keyword and a plurality of nodes, so as to find a first node matching the at least one keyword. For instance, in the tree structure as described above, the known administrative area names in all hierarchies of China and the place names or attraction names therein are all included. If the keyword "The Oriental Pearl" is retrieved from the contents of the network news, a search can be performed on the tree structure, and the first node being "The Oriental Pearl" can then be found. This means that, for the tree structure, the network news containing the keyword "The Oriental Pearl" has a regional characteristic and can be classified. In this embodiment of the invention, the comparing unit 950 can find the matching first node by using various algorithms for the tree structure, but the invention is not limited thereto.

In the step S1040, the labeling unit 970 can label the first node and at least one father ode related to the first node in the data document. For instance, in the tree structure, if the first node matching the keyword "The Oriental Pearls" of the network news is retrieved, the related father nodes are "Pudong New District," "Shanghai," and "China." Accordingly, besides that the network news containing the keyword "The Oriental Pearl" is labeled with the first node "The Oriental Pearls," it can also be labeled with the administrative areas in all hierarchies above the "The Oriental Pearls," which are the related father nodes of "Pudong New District," "Shanghai," and "China" above the first node "The Oriental Pearls."

Figure 12:
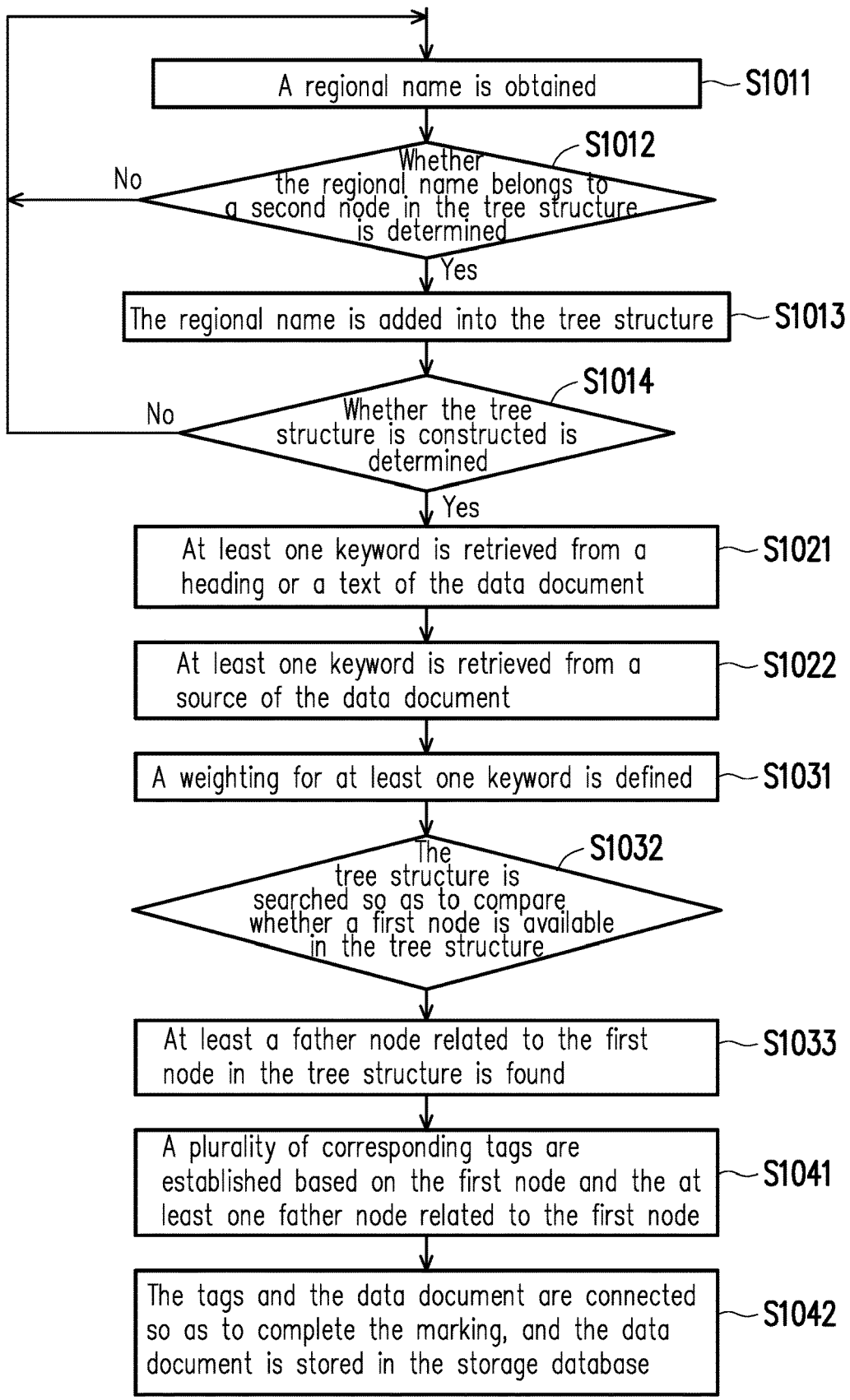
FIG. 12 is a flowchart illustrating a region labeling method of data documents according to another embodiment of the invention.

FIG. 12 is a flowchart illustrating a region labeling method of data documents according to another embodiment of the invention. As shown in FIG. 12, the region labeling method according to the embodiment of the invention includes steps S1011 to S1013, S1021 to S1022, S1031 to S1033 and S1041 to S1042. FIG. 13A to FIG. 13D are schematic diagrams illustrating the construction of a tree structure according to an embodiment of the invention.

Figure 13A:
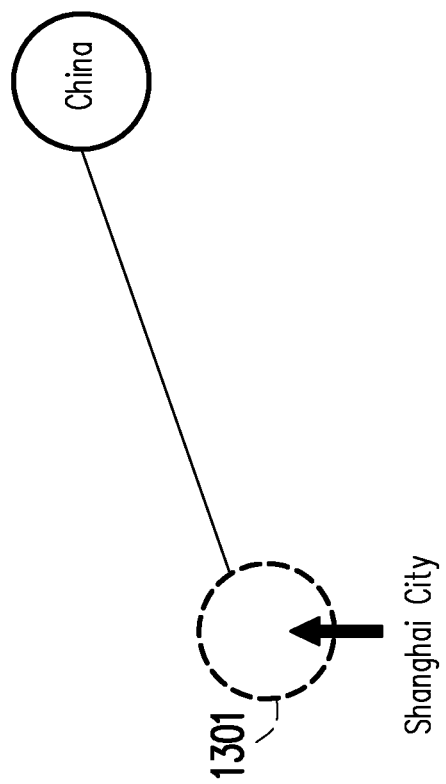

In step S1011, the classifying unit 910 obtains the regional name. For instance, the classifying unit 910 can obtain reference information regarding the administrative areas in each hierarchy of China and the attraction names therein from the server 103 via network. The reference information can be presented in various readable formats for the classifying unit 910, and the invention is not limited thereto. The classifying unit 910 can obtain each of the regional names sequentially according to the reference information. As shown in FIG. 13A, when the tree structure includes the node "China," the classifying unit 910 obtains the administrative area name of "Shanghai."

In step S1012, the classifying unit 910 determines whether the regional name belongs to a second node in the tree structure. If the result of such determination by the classifying unit 910 is yes, step S1013 is then executed. The second node can be a node of the region where the obtained regional name belongs to in the lowest hierarchy in the tree structure. For instance, as shown in FIG. 13A, when the tree structure includes the node "China," the classifying unit 910 obtains the administrative area name "Shanghai." In this case, the classifying unit 910 can determine that the second node of the administrative area name "Shanghai" can be a dashed line node 1301 depicted in FIG. 13A.

In step S1013, the classifying unit 910 adds the regional name into the tree structure. For instance, as shown in FIG. 13A, the classifying unit 910 can then construct, in the tree structure, the node "Shanghai" to correspond to the administrative area name that is obtained.

Figure 13C:
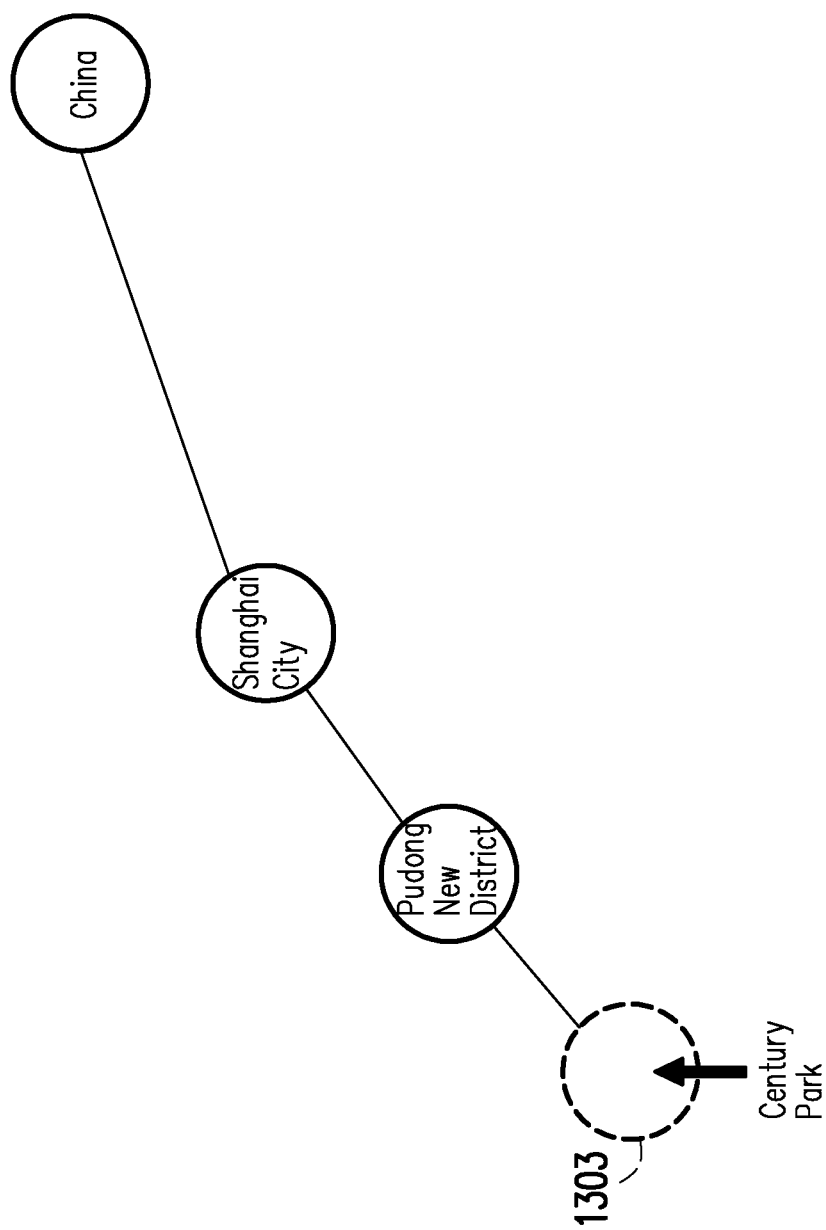
Figure 13D:
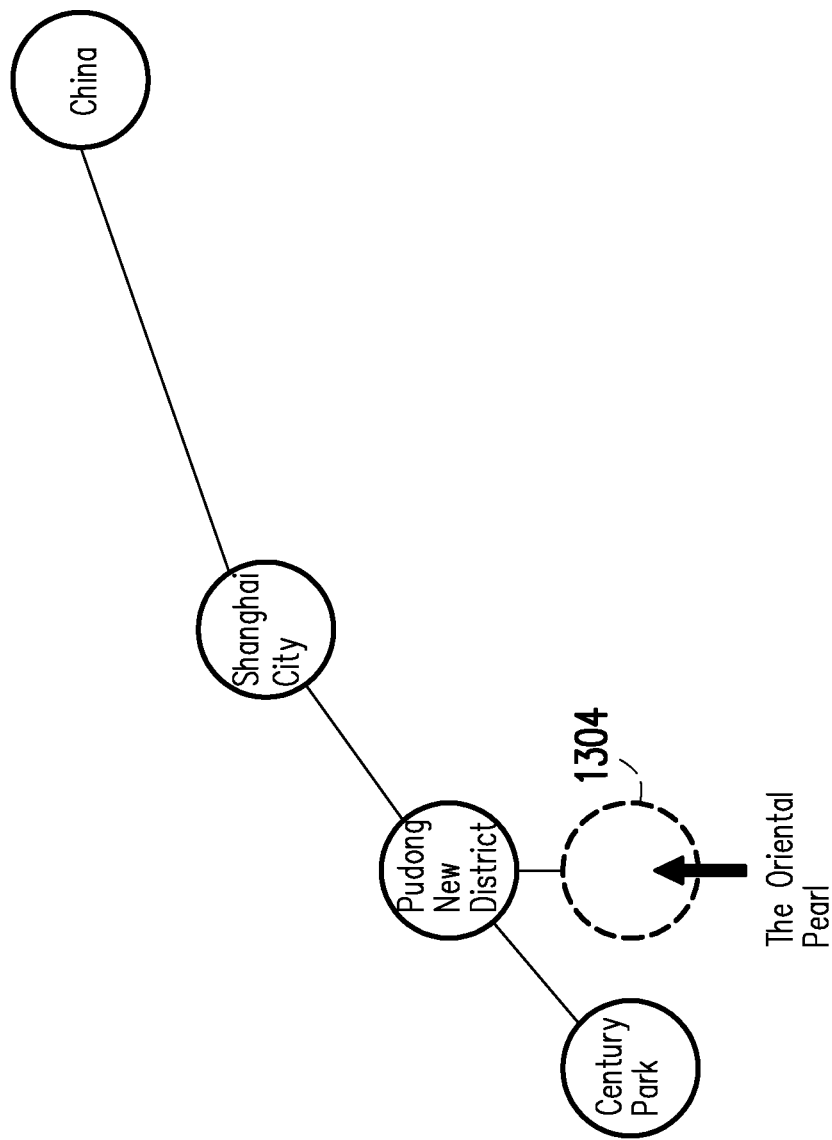

In step S1014, the classifying unit 910 determines whether the construction of the tree structure is completed. If the construction of the tree structure is completed, the step S1021 is executed. However, if the construction of the tree structure is not completed, the aforementioned steps S1011 to S1013 can be repeatedly executed. For instance, in FIG. 13B, the classifying unit 910 can determine that the second node, to which the administrative area name "Pudong New District" belongs, is a dashed line node 1302 and add the same. In FIG. 13C, the classifying unit 910 can determine that the second node, to which the attraction name "Century Park" belongs, is a dashed line node 1303 and add the same. In FIG. 13D, the classifying unit 910 can determine that the second node, to which the attraction name "The Oriental Pearl" belongs, is a dashed line node 1304 and add the same. The above processes are repeated until the classifying unit 910 constructs each node in the tree structure with the information regarding the administrative areas in all hierarchies of China and the attraction names therein, as shown in FIG. 11. The construction of the tree structure can be accomplished by using algorithms related to various tree structures, and the invention is not limited thereto. As described above, in FIG. 11, when the tree structure is constructed, each node of the tree structure includes the administrative area names in all hierarchies of China and the attraction names therein, and the relationship between upper nodes and lower nodes of the tree structure can correspond to the hierarchical relationship between the administrative areas or the attractions.

In step S1021, the retrieving unit 930 retrieves at least one keyword from a heading or a text of the data document. For instance, the content of the network news can include the heading content or the text content. Thus, the retrieving unit 930 can retrieve the keyword from the heading content and the text content, thereby determining the regional characteristic of the network news.

In step S1022, the retrieving unit 930 retrieves at least one keyword from a source of the data document. In this embodiment of the invention, the source of the data document can include a place of occurrence related to the data document and a location of a provider of the data document. For instance, because the contents of the heading and the text of the network news may not include any regional keyword, the retrieving unit 930 can further retrieve the keyword from the place of occurrence related to the network news. For instance, if the network news is released in a field "Huangpu District Local News" of a specific portal website, the retrieve unit 930 can retrieve the keyword "Huangpu District," or the retrieving unit 930 can further retrieve the keyword from the location of the provider of the network news. For instance, if the network news is released by a newspaper office "Shanghai Daily," the retrieving unit 930 can retrieve the keyword "Shanghai," or, if the network news is released by a newspaper office "Xinmin Evening News" and the location of the newspaper office "Xinmin Evening News" is Shanghai, the retrieving unit 930 can still obtain the keyword "Shanghai" by a lookup table or according to related information.

In step S1031, the comparing unit 950 respectively defines a corresponding weighting for at least one keyword. The weighting can represent an influence degree of the corresponding keyword to the regional characteristic of the data document. In other words, as the weighting corresponding to the keyword gets higher, a possibility that the comparing unit 950 uses such a keyword to determine the regional characteristic of the data document also gets higher. For instance, as described above, the keyword corresponding to the network news can be obtained from the text and heading of the network news, or according to the place of occurrence related and the location of the provider, and the keywords obtained from different places can correspond to different weightings. For instance, the weighting of the keyword retrieved according to the place of occurrence related to the network news is A; the weighting of the keyword retrieved from the heading of the network news is B; the weighting of the keyword retrieved from the text of the network news is C; and the weighting of the keyword retrieved according to the location of the provider of the network news is D, wherein the relative relationship thereof can be A>B>C>D. However, the relative relationship of the weightings can have other arrangements or modifications, and the invention is not limited thereto.

In step S1032, the comparing unit 950 searches the tree structure, so as to determine whether the first node exists in the tree structure, wherein the administrative area names or the iconic names included in the first node are identical to one of the at least one keyword. If the comparing unit 950 determines that the first node exists in the tree structure, the step S1033 is then executed. As described in step S1031, the calculated weighting can represent the influence degree of the corresponding keyword to the regional characteristic of the data document. Thus, in this embodiment of the invention, the comparing unit 950 can further use the weighting corresponding to the keyword as an order reference in comparing the keyword and the nodes. For instance, as described above, the same network news can include the keyword retrieved according to the place of occurrence related to the network news and the keyword retrieved from the text of the network news at the same time. In this case, the weighting of the keyword retrieved according to the place of occurrence related to the network news can be greater than the weighting of the keyword retrieved from the text of the network news. Therefore, the comparing unit 950 uses the keyword retrieved according to the place of occurrence related to the network news with priority to search the tree structure. Then, the comparing unit 950 can find the first node according to a searching algorithm of the tree structure, and the administrative area names or the iconic names included in the first node are identical to the keyword used with priority for searching. In this embodiment of the invention, the searching algorithm of the tree structure can be accomplished by various applications, and the invention is not limited thereto.

In step S1033, the comparing unit 950 finds at least a father node related to the first node in the tree structure. Owing to a hierarchy characteristic of the tree structure, the comparing unit 950 is capable of finding each father node from each upper hierarchy of the first node. For instance, as shown in FIG. 11, if the first node is "The Oriental Pearls," the related father nodes are "Pudong New District," "Shanghai," and "China."

In step S1041, the labeling unit 970 establishes a plurality of corresponding tags based on the first node and the at least one father node related to the first node. For instance, when the comparing unit 950 finds the first node of the network news that has the keyword "The Oriental Pearls," the labeling unit 970 not only sets "The Oriental Pearls" as one of the tags but also sets "Pudong New District," "Shanghai," and "China" as the tags of the network news. A method of establishing the tags can include recording a name corresponding to the first node and the related father nodes, or retrieving a link corresponding to the first node and the related father nodes, but the invention is not limited thereto.

In step S1042, the labeling unit 970 connects the tags and the data document so as to complete the labeling and stores the data document in the storage database 990. For instance, when all the tags, i.e. "The Oriental Pearls," "Pudong New District," "Shanghai," and "China," of the network news containing the keyword "The Oriental Pearls" are established, the labeling unit 970 connects the tags to the corresponding network news. A method of connecting the tags can include adding contents of the names of the first node and the related father nodes to the network news, or attaching the link of the first node and the related father nodes to the network news, but the invention is not limited thereto.

In summary, in the invention, the tree structure having a plurality of nodes is constructed by sequentially adding second nodes corresponding to the regional name, so that the nodes can have the hierarchical relationship between the administrative area names and the iconic names. Moreover, the regional keyword is obtained based on the heading content, the text content, the place of occurrence related to the data document, and the location of the provider of the data document. After the weighting corresponding to each keyword is defined to be used as the order reference for comparing the keyword and the tree structure, the matched first node and the father node thereof are found and used to label the corresponding data document, so that the data document has the corresponding regional characteristic.

As shown in FIG. 1, in another embodiment of the invention, the electronic device 101 and the server 103 can also be used to execute a sorting method of data documents.

In this embodiment of the invention, when the electronic device 101 includes a data document without a current ranking, the data document without the current ranking is uploaded to the server 103 for content analysis. Next, a predicting ranking of the data document without the current ranking is generated and sorted based on a sorting algorithm. Lastly, a result thereof is transmitted back to the electronic device 101. In this embodiment of the invention, if the predicting ranking of the data document without the current ranking is in top 100, this data document is deemed as "important." If the predicting ranking of the data document without the current ranking is not in top 100, this data document is deemed as "not important." In this embodiment of the invention, before the data document without the current ranking is received by the server 103, the server 103 can generate the sorting algorithm based on multiple data documents with the current rankings. In another embodiment of the invention, the electronic device 101 can generate the sorting algorithm based on multiple data documents with the current rankings. Therefore, the electronic device 101 can obtain the predicting ranking of the data document without the current ranking without going through the server 103. Details of generating the sorting algorithm and generating the predicting ranking of the data document are described below.

Figure 14:
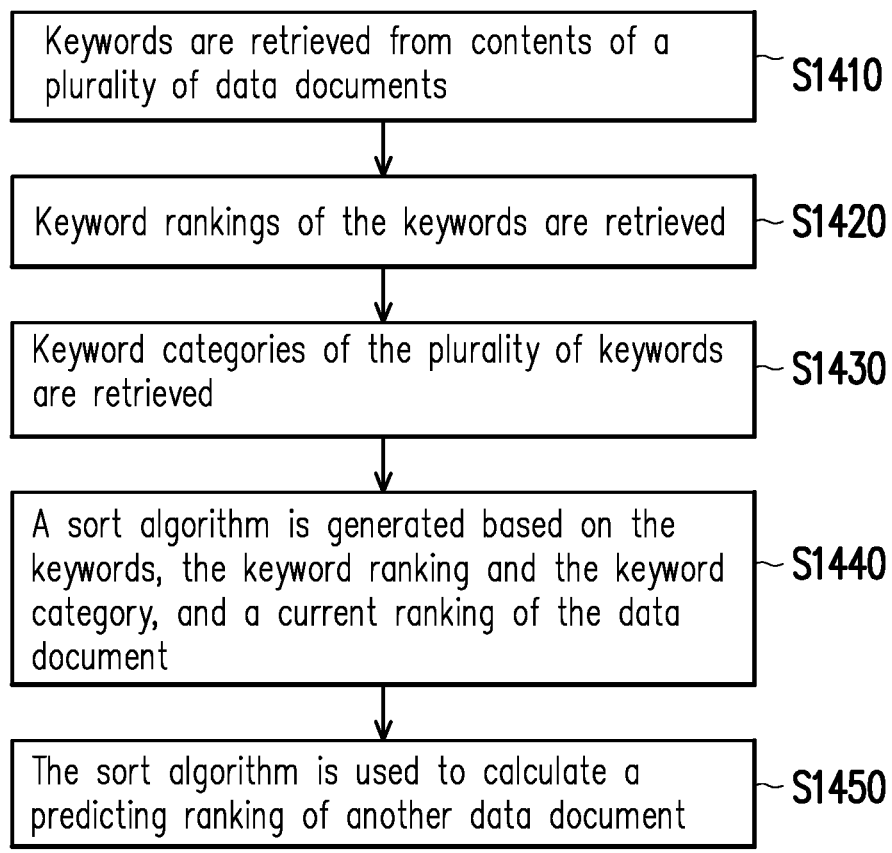
FIG. 14 is a flowchart illustrating a sorting method of data documents according to an embodiment of the invention.

FIG. 14 is a flowchart illustrating a sorting method of data documents according to an embodiment of the invention. As shown in FIG. 14, the sorting method of data documents according to an embodiment of the invention includes steps S1410 to S1450. Table 2 is a schematic diagram of the data documents with the current rankings according to the embodiment of the invention. Table 3 is a schematic diagram of the data document without the current ranking according to the embodiment of the invention. In this embodiment of the invention, the data document can be the news document. As shown in Table 2 and Table 3, the contents of the data document can further include the heading content and the text content. Please refer to FIG. 14, Table 2, and Table 3 together.

TABLE 2

| Data Document | | Keyword | Keyword Ranking | Keyword Category | Current Ranking |
|---|---|---|---|---|---|
| 1 | Heading Content | The Two Meetings | 152 | Political Meeting | 25 |
| | Text Content | National People's Congress | 96 | Political Meeting | |
| | | CPPCC Session | 135 | Political Meeting | |
| | | Xi Jinping | 33 | Politicians | |
| | | Hu Jintao | 47 | Politicians | |
| | | Two Sides of the Strait | 95 | International Relations | |

TABLE 2-continued

| Data Document | | Keyword | Keyword Ranking | Keyword Category | Current Ranking |
|---|---|---|---|---|---|
| 2 | Heading Content | iPhone 5 | 21 | Smart Phone | 38 |
| | | Apple | 57 | Technology Company | |
| | Text Content | Jobs | 42 | Technology Figure | |
| | | Cook | 108 | Technology Figure | |
| | | America | 317 | Nation | |
| | | Samsung | 96 | Technology Company | |
| 3 | Heading Content | I am a singer | 17 | TV Program | 67 |
| | Text Content | Terry Lin | 53 | Singer | |
| | | Huang Qishan | 66 | Singer | |
| 4 | Heading Content | Heat | 139 | Team | 184 |
| | Text Content | James | 87 | Player | |
| | | Miami | 106 | City | |
| | | Anthony | 127 | Player | |

TABLE 3

| Data Document | | Keyword | Keyword Ranking | Keyword Category | Predicting Ranking |
|---|---|---|---|---|---|
| 5 | Heading Content | Kai-fu Lee | 262 | Technology Figure | 360 |
| | Text Content | Innovation Works | 396 | Venture Capital Firm | |
| | | Microsoft | 137 | Technology Company | |
| | | Google | 192 | Technology Company | |

In step S1410, a plurality of keywords are retrieved from contents of a plurality of data documents. For instance, the keywords can be retrieved from the contents of data documents 1 to 4, respectively. For instance, the keyword "The Two Meetings" can be retrieved from the heading content of the data document 1, and the keywords "National People's Congress," "CPPCC Session," "Xi Jinping," "Hu Jintao," and "Two Sides of the Strait" can be retrieved from the text content of the data document 1.

In step S1420, corresponding keyword rankings of the plurality of keywords are retrieved by a search engine. For instance, the keyword rankings corresponding the keywords "The Two Meetings," "National People's Congress," "CPPCC Session," "Xi Jinping," "Hu Jintao," and "Two Sides of the Strait" retrieved by the search engine can be "152," "96," "135," "33," "47," and "95", respectively. In this embodiment of the invention, the keyword rankings can be keyword rankings of the current date, current week or current month which are retrieved by Google search engine, but the invention is not limited thereto.

In step S1430, keyword categories corresponding to the plurality of keywords are searched. For instance, the keyword categories retrieved corresponding to the keywords "The Two Meetings," "National People's Congress," "CPPCC Session," "Xi Jinping," "Hu Jintao," and "Two Sides of the Strait" of the data document 1 can be "Political Meeting," "Political Meeting," "Political Meeting," "Politicians," "Politicians," and "International Relations," respectively. In this embodiment of the invention, the corresponding keyword categories can be searched by using an encyclopedia database (e.g. Wiki encyclopedia) or other databases having classification mechanisms, but the invention is not limited thereto.

In step S1440, a sorting algorithm is generated based on the plurality of keywords, the keyword ranking and the keyword category of each of the plurality of keywords, and the current ranking of each of the plurality of data documents. For instance, according to the data documents 1 to 4 in Table 2, the sorting algorithm for predicting a predicting ranking of another data document is generated from the keyword, the keyword ranking and the keyword category of the keyword, and the current ranking (25, 38, 67, and 184) of each of the data documents 1 to 4. In this embodiment of the invention, the sorting algorithm can be generated by setting the keywords, the keyword ranking and the keyword category of each of the keywords as an input of the sorting algorithm and setting the current ranking of each of the data documents as an output of the sorting algorithm. The keyword ranking of the keyword included in the data document is related to the current ranking of the data document. Thus, in the case of sufficient data documents, the sorting algorithm corresponding to the relationship can be generated. In addition, the keyword category can be corresponding to the weighting value of the keyword. In other words, the keyword category of the keyword can be used to determine the influence degree of the keyword to the current ranking of the data document. In this embodiment of the invention, a category weighting parameter of the keyword category and a ranking weighting parameter of the keyword ranking can be predefined when the sorting algorithm is generated. The category weighting parameter and the ranking weighting parameter are adjusted and changed through a large number of test results until results of input values and output values of the sorting algorithm fall in a tolerable range of accuracy. In another embodiment of the invention, a curve fitting method can be utilized to calculate a simulation function (e.g. an analytic function) passing or substantially passing a data point (e.g. the input values and output values of the sorting algorithm) of a finite sequence when the sorting algorithm is generated. The curve fitting method can be a least square method, but the invention is not limited thereto.

In step S1450, the sorting algorithm is used to calculate a predicting ranking of another data document. For instance, because the current ranking of a data document 5 is unknown, when the sorting algorithm is obtained based on the data documents 1 to 4, the keyword of the data document 5 can be retrieved, and the keyword ranking and the keyword category of the keyword of the data document 5 can be inquired and input to the sorting algorithm. As a result, the predicting ranking of the data document 5 is calculated as being 360 so that the data document 5 can be sorted accordingly.

As described above, in this embodiment of the invention, the electronic device 101 can transmit the data document 5 without the current ranking to the server 103. The server 103 can generate the sorting algorithm by executing steps S1410 to S1440 and generate the predicting ranking of the data document 5 by executing step S1450, so as to perform sorting. Lastly, the result thereof is transmitted back to the electronic device 101. In another embodiment of the invention, steps S1410 to S1450 can all be executed in the electronic device 101, and the invention is not limited thereto.

Figure 15:
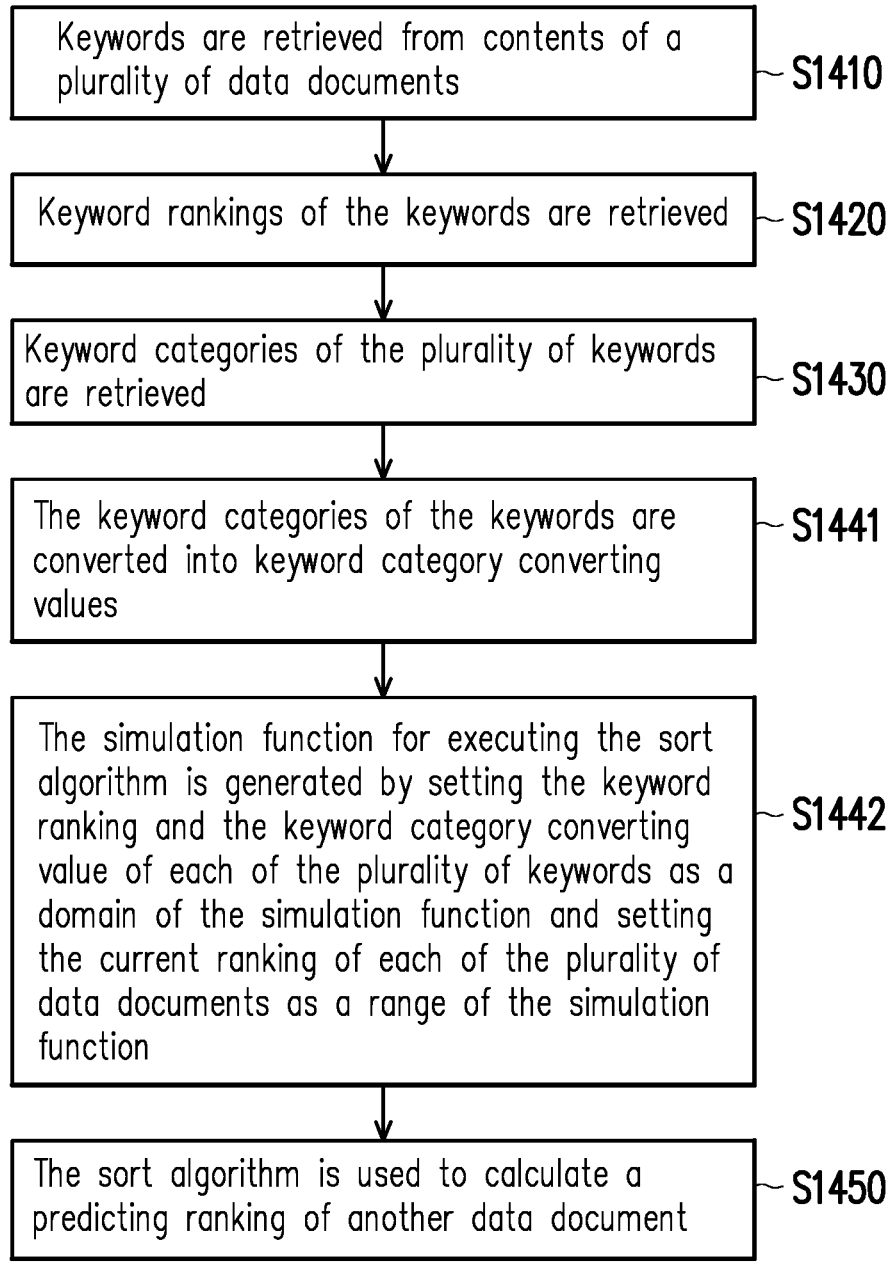
FIG. 15 is a flowchart illustrating a sorting method of data documents according to an embodiment of the invention.

FIG. 15 is a flowchart illustrating a sorting method of data documents according to an embodiment of the invention. As shown in FIG. 3, the sorting method of data documents according to an embodiment of the invention includes steps S1410 to S1430, S1441, S1442, and S1450. A difference between this embodiment and the above embodiments is described in detail below. In this embodiment of the invention, steps S1441 and S1442 can be further executed to generate the sorting algorithm.

In step S1441, the keyword categories of the plurality of keywords are converted into a plurality of keyword category converting values. For instance, by the lookup table or according to a specific formula, the keyword categories "Political Meeting," "Politicians," and "International Relations" of the data document 1 can be respectively converted into the keyword category converting values of 10, 20, and 30; the keyword categories "Smart Phone," "Technology Company," "Technology Figure," and "Nation" of the data document 2 can be respectively converted into the keyword category converting values of 40, 50, 60, and 70; the keyword categories "TV Program" and "Singer" of the data document 3 can be respectively converted into the keyword category converting values of 80 and 90; and the keyword categories "Team," "Player," and "City" of the data document 4 can be respectively converted into the keyword category converting values of 100, 110 and 120. The keyword category converting values as listed above are merely illustrated as example, and the invention is not limited thereto.

In step S1442, the simulation function for executing the sorting algorithm is generated by setting the keyword ranking and the keyword category converting value of each of the plurality of keywords as a domain of the simulation function and setting the current ranking of each of the data documents as a range of the simulation function. For instance, if variables corresponding to the keyword rankings are x0, x1, x2, x3, x4 and x5; variables corresponding to the keyword categories are y0, y1, y2, y3, y4 and y5; and the simulation function is f(x0, x1, x2, x3, x4, x5, y0, y1, y2, y3, y4, y5). In this case, referring to the data documents in Table 1, for the simulation function f(x0, x1, x2, x3, x4, x5, y0, y1, y2, y3, y4, y5), the domain of x0 includes 152, 21, 17 and 139; the domain of x1 includes 96, 57, 53 and 87; the domain of x2 includes 135, 42, 66 and 106; the domain of x3 includes 33, 108, 0 and 127; the domain of x4 includes 47, 317, 0 and 0; the domain of x5 includes 95, 96, 0 and 0; the domain of y0 includes 10, 40, 80 and 100; the domain of y1 includes 10, 50, 90 and 110; the domain of y2 includes 10, 60, 90 and 120; the domain of y3 includes 20, 60, 0 and 120; the domain of y4 includes 20, 70, 0 and 0; the domain of y5 includes 30, 50, 0 and 0; and the range of the simulation function f(x0, x1, x2, x3, x4, x5, y0, y1, y2, y3, y4, y5) includes 25, 38, 67 and 184. Next, the simulation function f(x0, x1, x2, x3, x4, x5, y0, y1, y2, y3, y4, y5) can be generated from the large number of test results, or the simulation function f(x0, x1, x2, x3, x4, x5, y0, y1, y2, y3, y4, y5) can be calculated by using the curve fitting method. In this embodiment of the invention, the simulation function can be one of a linear function and a nonlinear function.

In step S1450, the sorting algorithm is used to calculate a predicting ranking of another data document. For instance, as described above, after the simulation function for executing the sorting algorithm is generated, the predicting ranking of the data document 5 can then be calculated accordingly. For instance, the keyword rankings of the keywords of the data document 5 are first retrieved, which are 262, 396, 137, and 192 (respectively corresponding to x0, x1, x2, and x3, while x4=x5=0). Next, the keyword categories of the keywords of the data document 5 are searched, which are "Technology Figure," "Venture Capital Firm," "Technology Company," and "Technology Company," and the keyword category corresponding values are 60, 130, 50, and 50 (respectively corresponding to y0, y1, y2, and y3, and y4=y5=0). After the above is input to the simulation function f(x0, x1, x2, x3, x4, x5, y0, y1, y2, y3, y4, y5) as obtained, the predicting ranking of the data document 5, which is f(262, 396, 137, 192, 0, 0, 60, 130, 50, 50, 0, 0)=360, can be obtained for sorting the data document 5.

As described above, in this embodiment of the invention, the electronic device 101 can transmit the data document 5 without the current ranking to the server 103. Next, the server 103 can generate the sorting algorithm by executing steps S1410 to S1430, S1441, and S1442 and generate the predicting ranking of the data document 5 by executing step S1450 for sorting. Lastly, the result thereof is transmitted back to the electronic device 101. In another embodiment of the invention, steps S1410 to S1430, S1441 to S1442, and S1450 can all be executed in the electronic device 101, and the invention is not limited thereto.

To conclude the above, in the invention, by retrieving keywords from a plurality of data documents, setting the converting values corresponding to the keywords, the searched keyword rankings and keyword categories as the domain of the simulation function, and setting the current rankings of the plurality of data documents as the range of the simulation function, the simulation function can be generated from the large number of test results based on the category weighting parameter and ranking weighting parameter predefined, or the simulation function can be calculated using the curve fitting method. Lastly, the simulation function is used to execute the sorting algorithm so as to calculate the predicting ranking of another data document and to sort the another data document.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A method for sorting and displaying a plurality of landmark data from a search of a place name keyword, the method comprising:

inputting the place name keyword to a server to search for the plurality of landmark data, wherein each of the plurality of landmark data comprises fields of a landmark name, an objective level category, an address, and an address quoting frequency;

sorting the plurality of landmark data by an electronic device to a display order based on a characterized parameter for each of the plurality of landmark data, wherein the characterized parameter is calculated based on at least a publicity, wherein the publicity is a calculation of the objective level category and the address quoting frequency with respectively weighting to the objective level category and the address quoting frequency, wherein the objective level category is associated with a public-accepted rating level of a landmark; and displaying the plurality of landmark data by the electronic device according to the display order, wherein the publicity is a linear summation of the objective level category and the address quoting frequency by using a first weight value to weight the objective level category associated with the public-accepted rating level of the landmark and using a second weight value to weight the address quoting frequency, wherein the first weight value for weighting the objective level category associated with the public-accepted rating level of the landmark and the second weight value for weighting the address quoting frequency are predetermined fixed values with a fixed ratio for the first weight value to the second weight value, and the second weight value for weighting the address quoting frequency is larger than the first weight value for weighting the objective level category associated with the public-accepted rating level of the landmark.

2. The method of claim 1, wherein a value of the objective level category used in a process of calculating the publicity is generated by converting the public-accepted rating level of the landmark to a predetermined value, wherein a value of the address quoting frequency used in the process of calculating the publicity is generated by taking a natural log value on the address quoting frequency and multiplying a constant.

3. The method of claim 2, wherein the constant to multiply to the natural log value is ten.

4. The method of claim 2, wherein the public-accepted rating level of the landmark comprises an accepted attraction rating, an accepted store rating, or an accepted shop rating.

5. The method of claim 1, wherein the characterized parameter is calculated further based on a conformity, the conformity is calculated based on a matching degree of the landmark data to the place name keyword, wherein the characterized parameter is a linear summation of the publicity and the conformity with weighting.

6. The method of claim 1, wherein the characterized parameter is calculated further based on a distance fraction, the distance fraction is calculated based on a distance degree between a location of the landmark data and a location of the electronic device, wherein the characterized parameter is a linear summation of the publicity and the distance fraction with weighting.

7. The method of claim 1, wherein the characterized parameter is calculated further based on:

a conformity, wherein the conformity is calculated based on a matching degree of the landmark data to the place name keyword; and a distance fraction, wherein the distance fraction is calculated based on a distance degree between a location of the landmark data and a location of the electronic device, wherein the characterized parameter is a linear summation of the publicity, the conformity and the distance fraction with weighting.

8. The method of claim 1, wherein the server is searching to a landmark database, the landmark database comprises a large number of data documents, each of the data documents has been constructed by a tree structure and stored in the electronic device or the server, wherein a node of the tree structure is also labelled by regional name.

* * * * *